US012089687B2

(12) United States Patent
Pachao Morbitzer et al.

(10) Patent No.: US 12,089,687 B2
(45) Date of Patent: Sep. 17, 2024

(54) ANTIVIRUS HELMET

(71) Applicant: MORBPAC S.R.L., Dina Huapi (AR)

(72) Inventors: Nelson Mario Pachao Morbitzer, Dina Huapi (AR); Gustavo Sergio Ortiz Uriburu, San Carlos de Bariloche (AR)

( * ) Notice: Subject to any disclaimer, the term of this patent is extended or adjusted under 35 U.S.C. 154(b) by 758 days.

(21) Appl. No.: 17/354,165

(22) Filed: Jun. 22, 2021

(65) Prior Publication Data

US 2021/0401105 A1 Dec. 30, 2021

Related U.S. Application Data

(60) Provisional application No. 63/045,093, filed on Jun. 27, 2020.

(51) Int. Cl.

*A42B 3/28* (2006.01)
*A42B 3/10* (2006.01)
*A62B 7/10* (2006.01)
*A62B 18/04* (2006.01)

(52) U.S. Cl.

CPC .............. *A42B 3/288* (2013.01); *A42B 3/105* (2013.01); *A42B 3/283* (2013.01); *A62B 7/10* (2013.01); *A62B 18/04* (2013.01)

(58) Field of Classification Search

CPC ........ A42B 3/00–328; A62B 18/00–10; A62B 7/00–08; A62B 7/12–14; A62B 23/00–06; A41D 13/11–1192

See application file for complete search history.

(56) References Cited

U.S. PATENT DOCUMENTS

| | | | | |
|---|---|---|---|---|
| 3,963,021 A * | 6/1976 | Bancroft | A62B 18/045 | 128/201.25 |
| 6,826,783 B1 * | 12/2004 | Grove | A42B 3/10 | 128/201.25 |
| 7,028,688 B1 * | 4/2006 | Grove | A62B 17/04 | 128/206.17 |
| 8,640,265 B2 * | 2/2014 | Duncan | A42B 1/048 | 2/205 |
| 9,155,924 B1 * | 10/2015 | Grove | A62B 18/02 | |
| 9,468,783 B1 * | 10/2016 | Epstein | B05D 5/00 | |
| 10,426,212 B1 * | 10/2019 | Ratliff | A42B 3/065 | |
| 2003/0182710 A1 * | 10/2003 | Klotz | A41D 13/0025 | 2/457 |
| 2004/0182385 A1 * | 9/2004 | Uusitalo | A42B 3/288 | 128/201.24 |
| 2006/0137686 A1 * | 6/2006 | Macris | A61M 16/107 | 128/201.22 |

(Continued)

FOREIGN PATENT DOCUMENTS

| | | | | |
|---|---|---|---|---|
| GB | 2367755 A * | 4/2002 | A62B 17/04 | |
| WO | WO-2021257038 A1 * | 12/2021 | A42B 3/22 | |

*Primary Examiner* — Valerie L Woodward
*Assistant Examiner* — Paige Kathleen Bugg
(74) *Attorney, Agent, or Firm* — Mariana I. Vernieri

(57) ABSTRACT

Antivirus helmets and techniques to manufacture the antivirus helmets are provided. The antivirus helmets can protect subjects from viruses, bacteria, or other types of pathogens. The antivirus helmets can be modular and can isolate a subject wearing the antivirus helmets from the surrounding environment. The antivirus helmets can be deformable and can be worn during extended periods while protecting a subject wearing the antivirus helmet and other subjects in the environment surrounding the subject.

10 Claims, 10 Drawing Sheets

(56) References Cited

U.S. PATENT DOCUMENTS

| | | | | |
|---|---|---|---|---|
| 2010/0108070 | A1 | 5/2010 | Kwok | |
| 2010/0300435 | A1* | 12/2010 | Thiruppathi | A62B 18/04 128/201.25 |
| 2013/0190643 | A1 | 7/2013 | Brambilla | |
| 2016/0361510 | A1 | 12/2016 | Alphonse | |
| 2019/0118918 | A1 | 4/2019 | Xiao | |
| 2020/0178622 | A1* | 6/2020 | Jascomb | B32B 27/08 |
| 2021/0275842 | A1* | 9/2021 | Conrad | A42B 3/286 |
| 2021/0353977 | A1* | 11/2021 | Hulbert | A62B 18/084 |

* cited by examiner

ANTIVIRUS HELMET

CROSS REFERENCE TO RELATED APPLICATIONS

This application claims the benefit of U.S. Provisional Patent Application No. 63/045,093 filed Jun. 27, 2020, which is incorporated by reference herein in its entirety.

TECHNICAL FIELD

The present invention relates in general to the field of personal protective equipment, and, more specifically, to an antivirus helmet and methods for providing an antivirus helmet.

BACKGROUND OF THE INVENTION

There is a wide variety of personal protective equipment (PPE) for avoiding exposure to virus, bacteria, or other types of pathogens, Examples of PPE include protective face masks. Those protective masks typically cover the mouth and nose of a subject, leaving the eyes and ears uncovered. As a result, those protective face masks are generally used in conjunction with goggles or face shields.

Although commonplace protective masks, individually or in combination with other PPE, can provide reasonable protection, prolonged use of a protective mask and/or the other PPE may cause skin irritation or injuries. Further, those protective masks may have poor ergonomic fit. As a result of irritation or poor fit, or both, subjects wearing those protective masks for an extended period tend to reposition the masks over time, while wearing the masks. Repositioning a protective mask and/or PPE can exacerbate skin irritation and, more critically, can potentially create hazardous situations where the protective masks cannot provide protection. Further, commonplace protective masks may not allow consumption of fluids. A situation that can cause interruptions in the use of the protective masks. Regardless of being justified or not, such interruptions can increase the risk of exposure to a hazardous environment. Therefore, much remains to be improved in PPE. Thus, technologies that improve PPE may be desired.

SUMMARY OF THE INVENTION

The disclosure recognizes and addresses, among other technical challenges, the lack of efficient PPE that can be worn for extended periods during travel or other routine activities. The disclosure provides antivirus helmets and techniques to manufacture the antivirus helmets. The antivirus helmets can protect subjects (human or animal) from viruses, bacteria, or other types of pathogens in various types of environments, such as hospitals, public spaces, restaurants, hotels, airplanes or other type of vehicles with a closed cabin, or similar. The antivirus helmets of this disclosure can be modular and can isolate a subject wearing the antivirus helmets from the surrounding environment. The disclosed antivirus helmets can be deformable and can be worn during extended periods while protecting a subject the antivirus helmet and other subjects in the environment surrounding the subject. To that end, the antivirus helmets of this disclosure provide a unidirectional pathway for air to flow from the helmet exterior to filtering elements integrated into the antivirus helmet and again to the antivirus helmet exterior. The filtering elements can be removed and replaced to configure an antivirus helmet for use in a particular environment that is potentially contaminated or otherwise hazardous. In some cases, the filtering elements can retain pathogens that have been removed from inhaled and/or exhaled air. The filtering elements can be removed from the antivirus helmets for analysis after use. In other cases, the filtering elements can kill pathogens removed from the inhaled and/or the exhaled air.

After exhaled air is cleaned by the filtering elements of a disclosed antivirus helmet, the clean exhaled air can egress the antivirus helmet through a breathable fabric that can fit snugly to the neck of the subject wearing the helmet. The sleeve can have high impedance at the output of the clean exhaled air, thus causing an egress compartment to form and remain pressurized during utilization of the antivirus helmet. By being pressurized, the egress compartment can remain isolated from external air intake, further causing the air that is inhaled to traverse the unidirectional pathway provided by the antivirus helmet.

The antivirus helmets of this disclosure provide several advantages with respect to conventional masks or other types of PPE. As an example, the antivirus helmets of this disclosure have great power autonomy based on the high efficiency forcing units that aid in the flow of air from and to an exterior environment of the helmet. As another example, the antivirus helmets of this disclosure are essentially hermetic while being lightweight and ergonomic. As a result, the antivirus helmets provide greater protection and comfort than what is provided by surgical masks or other types conventional masks.

Additional elements or advantages of the disclosed antivirus helmets and technique to produce the antivirus helmets will be set forth in part in the description which follows, and in part will be apparent from the description, or may be learned by practice of this disclosure. The advantages of the disclosure can be realized and attained by means of the elements and combinations particularly pointed out in the appended claims. It into be understood that both the foregoing general description and the following detailed description are exemplary and explanatory only and are not restrictive of the subject disclosure.

BRIEF DESCRIPTION OF THE DRAWINGS

The annexed drawings are an integral part of the disclosure and are incorporated into the present specification. The drawings illustrate examples of embodiments of the disclosure and, in conjunction with the description and claims, serve to explain, at least in part, various principles, features, or aspects of the disclosure. Some embodiments of the disclosure are described more fully below with reference to the drawings. However, various aspects and elements of the disclosure can be implemented in many different forms and should not be construed as being limited to the implementations set forth herein. Like numbers refer to like, but not necessarily the same or identical, elements throughout. The accompanying drawings can be briefly characterized as follows.

DETAILED DESCRIPTION AND BEST MODE OF IMPLEMENTATION

Figure 1A:
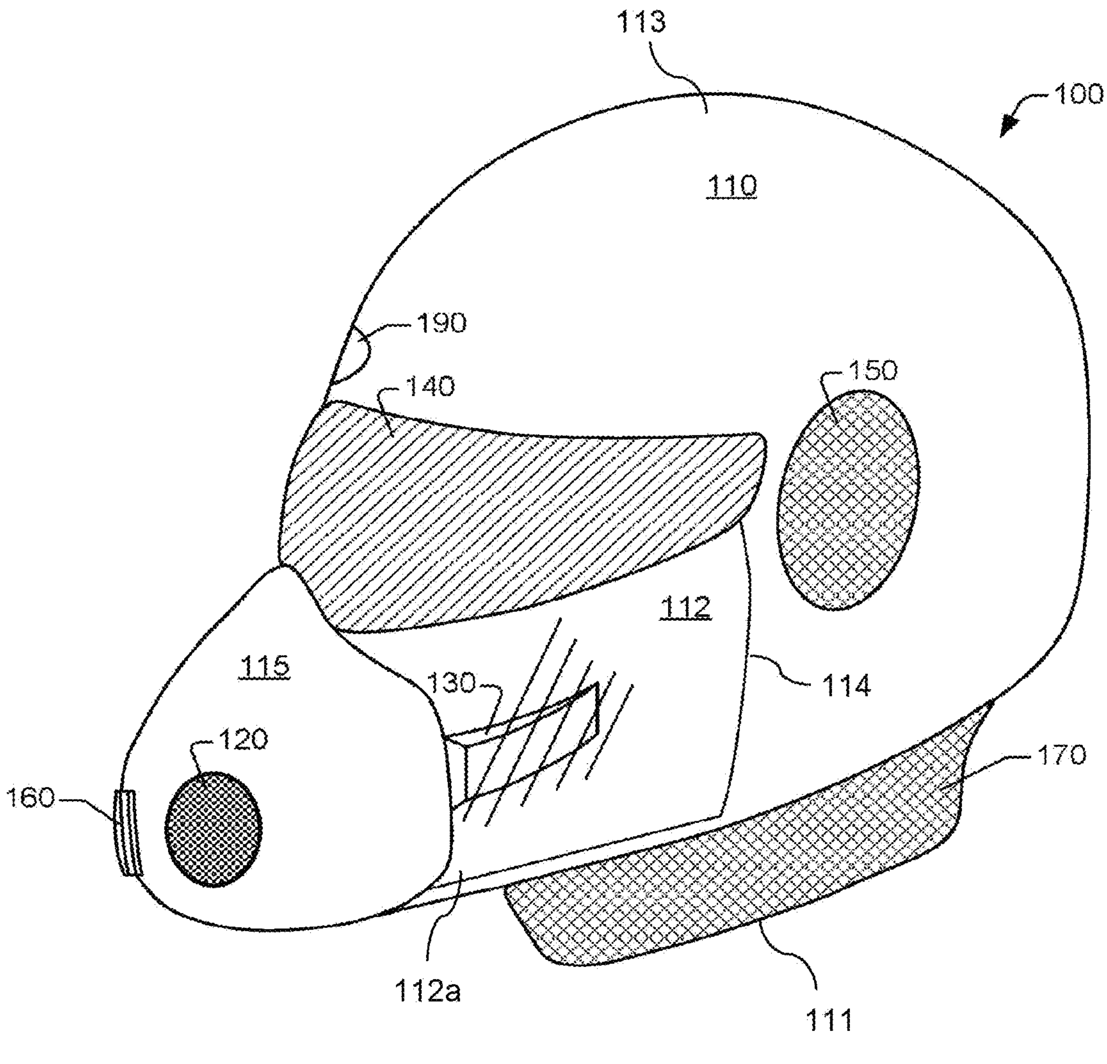
FIG. 1A illustrates a side view of an example of an antivirus helmet in accordance with one or more embodiments of this disclosure.

As mentioned, this disclosure recognizes and addresses, among other technical challenges, the lack of efficient PPE that can be worn for extended periods during travel or other routine activities. FIG. 1A is a schematic side view of an example of an antivirus helmet 100 in accordance with one or more embodiments of this disclosure. The antivirus helmet 100 includes a solid covering 110 assembled to receive a human head through a head-opening 111 opposite an apex region 113 of the solid covering 110. The solid covering 110 can be formed from a memory shape material. The memory shape material can include, for example, a shape memory polymer or a memory shape alloy, or a combination of both. An example of the memory shape material is a thermoplastic polyurethane shape memory polymer (SMP).

Due to memory properties of such a material. the solid covering 110 can be deformable. Specifically, the solid covering 110 can be deformed while wearing the antivirus helmet 100, and can restore an original shape after the antivirus helmet 100 is worn. Because the solid covering 110 is deformable, the antivirus helmet 100 can be worn comfortably during extended periods of activity and/or rest. This should increase the comfort of the antivirus helmet 100 during long term use, including travel. In some situations, the shape of a portion of the solid covering 110 can adjust to a surface (of a seat headrest or bunk bed, for example) onto which the head of a subject rests. The portion of the solid covering 110 can restore a prior shape after the resting period elapses and the head of the subject no longer rests on that surface.

The antivirus helmet 100 also includes flexible soft portions 112*a* partially coupled to the solid covering 110. While being worn by a subject, the flexible soft portions 112*a* and facial surfaces of the subject can form respective pockets configured to receive exhaled air, as is described in greater detail below. The flexible soft portions 112*a* can permit a subject wearing the antivirus helmet 100 to interact with skin underneath those portion and/or eyes of a subject wearing the antivirus helmet 100, without direct contact with the skin or the eyes. Interacting with the skin and eyes can include, for example, applying pressure to the face as it may be the case when scratching or massaging the face, or rubbing one or both eyes. In some embodiments, the flexible soft portions 112*a* can be configured for easy removal in emergency situations. An example of an emergency situation includes the subject feeling an urge to vomit or vomiting while wearing the antivirus helmet 100. The flexible soft portions 112*a* can be formed from silicone, latex, or another type of elastic non-breathable material.

Figure 1B:
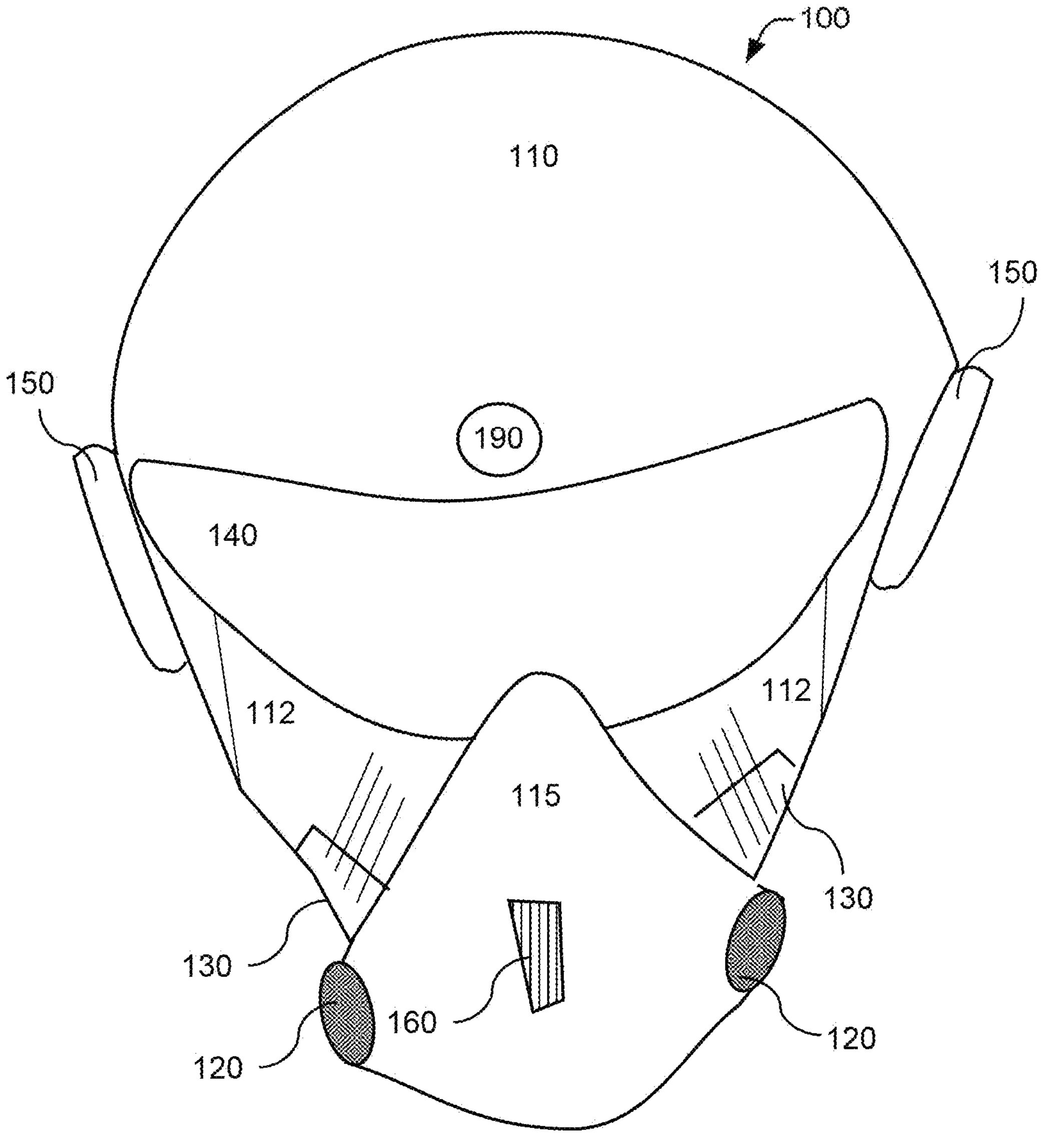
FIG. 1B illustrates a front view of the example antivirus helmet shown in FIG. 1A.
Figure 1C:
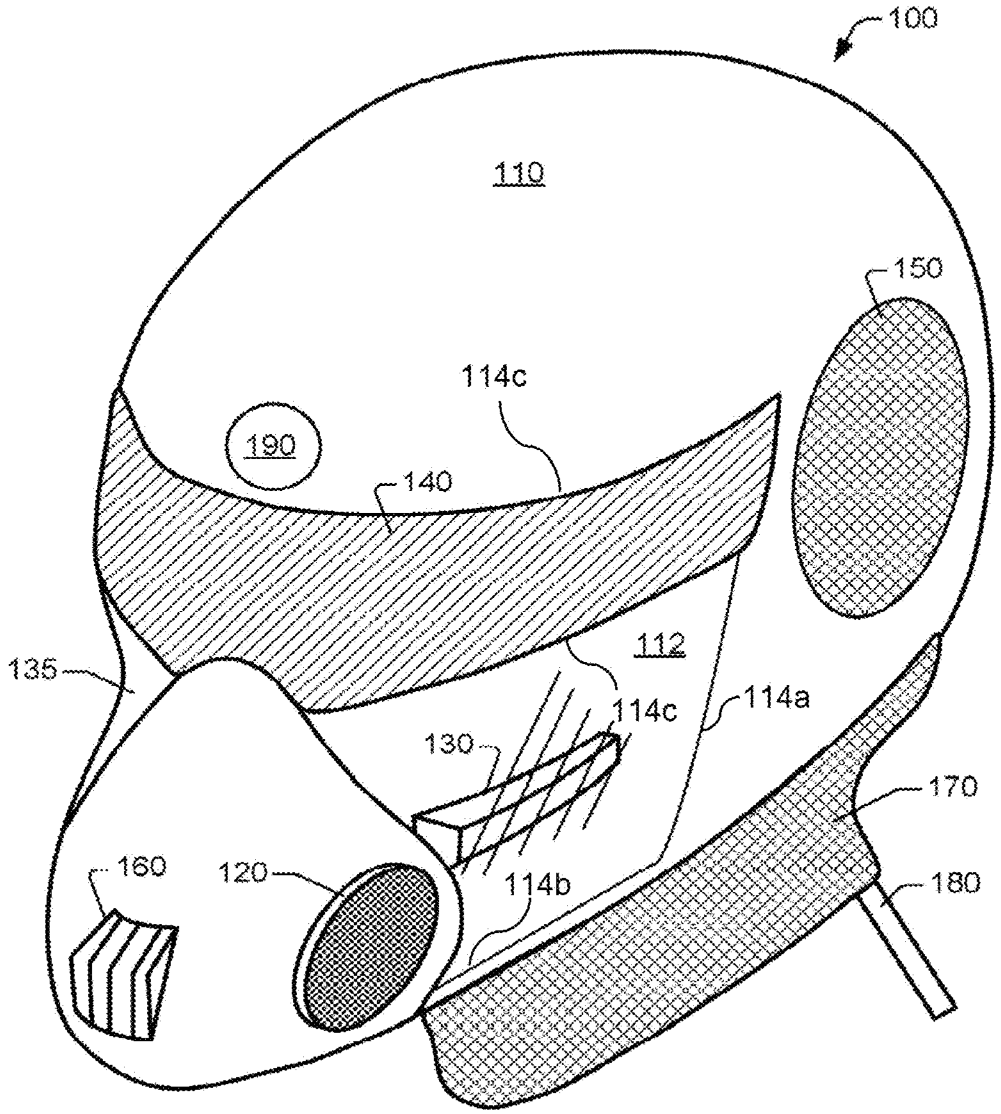
FIG. 1C illustrates a perspective view the example antivirus helmet shown in FIG. 1A.

As is illustrated in FIG. 1A, for example, the antivirus helmet 100 can include an elastic covering 112 that constitutes, at least in part, such flexible soft portions 112*a*. While being worn by a subject, the elastic covering 112 and a facial surface of the subject can form a pocket configured to receive exhaled air, as is described in greater detail below. The elastic covering 112 can be attached to the solid covering 110 and a breathing module 115 included in the antivirus helmet 100. Thus, the elastic covering 112 can form one or many interfaces 114 with the solid covering 110. As is illustrated in FIG. 1C, the elastic covering 112 can form a first interface 114*a* with a section of the solid covering 110 near a cheekbone area, and a second interface 114*b* with an elongated portion of the solid covering 110 near the neck area. The elongated portion can constitute, for example, a rib or another type elongated frame member that extends along the mandible area. In addition, the elastic covering 112 also can form a third interface 114*c* with the pane 140. Because the head of a subject wearing the antivirus helmet 100 can have bilateral symmetry with respect to a sagittal plane. two elastic coverings 112 can be integrated into antivirus helmet 100 as is shown in FIG. 1B Similarly, the solid covering 110 includes two ribs, or two frame members. Accordingly, the first interface 114*a*, the second interface 114*b*, and the third interface 114*c* can be present in both sides of the antivirus helmet 100. Each one of the first interface 114*a*, the second interface 114*b*, and the third interface 114*c* is hermetic.

There are numerous ways to attach the elastic covering 112 to the solid covering 110, thus forming the first and second interfaces 114*a* and 114*b*. In one example, the solid covering 110 can include a first elongated recess that can extend from the eye-socket region to the mandible region. The first elongated region can receive a portion of the elastic covering 112. For instance, the portion of the elastic covering 112 can be inserted into the first elongated recess by snapping that portion into the first elongated recess, thus forming the first interface. In another example, rather than including the first elongated recess, the solid covering 110 can include an elongated ridge and the elastic covering 112 can include an elongated recess that receives the elongated ridge, thus forming the first interface. In yet another example, the portion of the elastic covering 112 can be chemically soldered to the solid covering 110 along a portion that extends from the eye-socket region to the mandible region, thus forming the first interface 114*a*.

In still another example, the solid covering 110 can include a second elongated recess that can extend along the rib or frame member of the solid covering 110. The second elongated region can receive a portion of the elastic covering 112. For instance, the portion of the elastic covering 112 can be inserted into the second elongated recess by snapping that portion into the second elongated recess, thus forming the second interface 114*b*. In a further example, rather than including the second elongated recess, the solid covering 110 can include an elongated ridge and the elastic covering 112 can include an elongated recess that receives the elongated ridge, thus forming the second interface 114*b*. In yet another example, the portion of the elastic covering 112 can be chemically soldered to the rib or frame member of solid covering 110, thus forming the second interface 114*b*. Folding techniques also may be utilized to join the solid covering 110 to one or more elastic coverings 112.

The solid covering 110 can be formed to receive a pane 140. A hermetic seal can be formed upon attaching the pane 140 to the solid covering 110. In some embodiments, the solid covering 110 can define an elongated recess that receives a portion of the pane 140. In one of those embodiments, the portion of the pane 140 can be inserted into the recess by snapping the portion of the pane 140 into the recess. The pane 140 can be curved and can have one of various shapes. The pane 140 is transparent and can be formed from glass or plastic. The material that forms that pane 140 can be clear or tinted. For purposes of illustration, a pane 140 that is clear can have an optical transmittance that exceeds a threshold value (e.g., 80% or 90%) for each one (or at least a group) of wavelengths in the interval from about 400 nm to about 800 nm. In turn, a pane 140 that is tinted can have an optical transmittance that is less than the threshold value and exceeds a second threshold value (e.g., 40% or 50%) for each one (or at least a group) of wavelengths in such an interval. In sonic embodiments, the pane 140 can be formed from a photosensitive material that changes the transparency of the pane 140 in response to lighting conditions in the exterior environment of the antivirus helmet 100. In other embodiments, the pane 140 can be formed from an electrochromic material, and thus, the transparency of the pane 140 can be adjusted by the application of an electric field to the pane 140. To that end, the antivirus helmet 100 can include a control component (not depicted in FIG. 1A) that permits adjusting the applied electric field. The control component can execute program code (e.g., control logic) to adjust the applied electric field. The control component can be embodied in, or can include, for example, a microcontroller, a programmable logic controller (PLC), or another type of processor.

As mentioned, the antivirus helmet 100 also can include a breathing module 115. The breathing module 115 can be attached to each one of the pane 140; the elastic covering(s) 112 included in the antivirus helmet 100; and the ribs or frame members of solid covering 110. The breathing module 115 can be soldered to the elastic covering(s) 112. A hermetic seal can be formed upon attaching the breathing module 115 to the solid covering 110. In some embodiments, the breathing module 115 can be removably attached to the pane 140 and portions of the solid covering 110. Upon attaching the breathing module 115 to the pane 140, the elastic coverings 112, and the solid covering 110, a breathing compartment can be formed in the interior of the antivirus helmet 100. In some embodiments, the breathing module 115 can be formed from silicone or other types of polymers.

The breathing module 115 defines an opening that receives an inhalation filter unit 120. The inhalation filter unit 120 can be removably attached to the breathing module 115 in some embodiments. The inhalation filter unit 120 can clean air that is inhaled by a subject wearing the antivirus helmet 100. The inhalation filter unit 120 can trap virus cells present in the inhaled air and, thus, can protect the subject wearing the antivirus helmet 100. Again, because the head of a subject wearing the antivirus helmet 100 can have bilateral symmetry with respect to a sagittal plane, the breathing module 115 can include two inhalation filter units 120 as is shown in FIG. 18, This disclosure is, of course, not limited in that respect, and another number of inhalation filter units 120 can be assembled in the antivirus helmet 100.

In some embodiments, the inhalation filter unit 120 can be removably assembled. Thus, the captured virus cells can be analyzed after the antivirus helmet 100 is worn (e.g., after the duration of a trip or after participating in another type of activity within a confined environment, such as a workout session at a gymnasium). For example, after the antivirus helmet 100 is worn, the inhalation filter unit 120 can be removed from the antivirus helmet 100 to probe filtering elements contained in the inhalation filter unit 120 for presence of a particular type of virus (e.g., coronaviruses, such as Covid-19, SARS, or MERS).

The filtering elements integrated into the inhalation filter unit 120 can be embodied in, or can constitute, one or several high efficiency filters. At least one of the high efficiency filter(s) can be a high-efficiency particulate air (HEPA) filter. In some embodiments, each one of the high-efficiency filters is a HEPA filter. A HEPA filter may remove at least 99.97% of dust, pollen, mold, bacteria, and any airborne particles with a size of 0.3 μm. In some configurations, the filtering elements integrated into the inhalation filter unit 120 can be removed and replaced with other filtering elements having different characteristics (such as microstructure or nanostructure) suited for use in a particular type of embodiment. As an illustration, first filtering elements utilized during a long-haul trip by airplane can be removed from the antivirus helmet 100 and replaced with second filtering elements suitable for use in a harsh environment where heavy-metal particulate matter may be present. In addition, or in some embodiments, the filtering elements can have high efficiency trapping areas. Those areas can contain and stabilize viral loads or amounts of other types of pathogens or allergens during use of the antivirus helmet 100. As another illustration, the inhalation filter unit 120 can include first filtering elements that can contain a viral load or a number of disease-causing particles. The first filtering elements can be replaced with second filtering elements that can kill the viral load or destroy the disease-causing particles.

Air that is filtered by the inhalation filter unit 120 upon inhalation can pass through the respiratory airways of a subject wearing the antivirus helmet 100 and can reach the lungs of the subject. The subject can subsequently exhale air. Exhaled air can traverse the respiratory airways and can reach an exhalation filter unit 130 assembled on the breathing module 115, beneath a flexible soft portion 112*a* of the solid covering 110. Because the head of a subject wearing the antivirus helmet 100 can have bilateral symmetry with respect to a sagittal plane, the breathing module 115 can include two exhalation filter units 130 as is shown in FIG. 1B. This disclosure is, of course, not limited in that respect, and another number of exhalation filter units 130 can be assembled in the antivirus helmet 100.

The exhalation filter unit 130 can trap virus cells present in the exhaled air. Thus, the exhalation filter unit 130 can protect subjects surrounding the subject wearing the antivirus helmet 100 in case the person using the helmet is infected by the virus. In some embodiments, the exhalation filter unit 130 can be removably assembled. As such, the captured virus cells can be analyzed after the antivirus helmet 100 is worn. For example, after the antivirus helmet 100 is worn, the exhalation filter unit 130 can be removed from the antivirus helmet 100 to probe filtering elements contained in the exhalation filter unit 130 for presence of a particular type of virus (e.g., coronaviruses, such as Covid-19, SARS, or MERS).

The filtering elements integrated into the exhalation filter unit 130 can be embodied in, or can constitute, one or several high efficiency filters. At least one of the high efficiency filter(s) can be a HEPA filter. As mentioned, in some embodiments, each one of the high-efficiency filters is a HEPA filter. A HEPA filter may remove at least 99.97% of dust, pollen, mold, bacteria, and any airborne particles with a size of 0.3 μm. In some configurations, the filtering elements integrated into the exhalation filter unit 130 can be removed and replaced with other filtering elements having different characteristics (such as microstructure or nano-structure) suited for use in a particular type of embodiment or a desired filtering action. As an illustration, first filtering elements utilized during a long-haul trip by airplane can be removed from the antivirus helmet 100 and replaced with second filtering elements suitable for use in a harsh environment where heavy metal particulate matter may be present. In addition, or in some embodiments, the filtering elements can have high efficiency trapping areas. Those areas can contain and stabilize viral loads or amounts of other types of pathogens or allergens during use of the antivirus helmet 100. As another illustration, the exhalation filter unit 130 can include first filtering elements that can contain a viral load or a number of disease-causing particles. The first filtering elements can be replaced with second filtering elements that can kill the viral load or destroy the disease-causing particles.

Because the filtering elements can be removable and replaceable, the antivirus helmet 100 can be reversibly configurable and can be utilized is multiple scenarios. In one example, filtering elements that can be used in in industrial facilities, with specific filter capacity, can be assembled in the antivirus helmet 100. In another example, filtering elements that can be used in a facility with different types of viruses can be assembled in the same antivirus helmet 100.

The antivirus helmet 100 further includes a sleeve 170 assembled around the head-opening 111 of the antivirus helmet 100. The sleeve 170 can be attached to the ribs (or frame members) of the solid covering 110, and to other portions of the solid covering 110 surrounding said head-opening 111. To that end, in one example, a portion of the sleeve 170 can be soldered to the ribs (or frame members) and to those other portions of the solid covering. 110. In another example, the solid covering 110 can include an elongated recess that surround the head-opening 111, wherein the elongated recess can receive the portion of the sleeve 170, forming a hermetic seal.

The sleeve 170 can be formed to fit snugly around a neck of a subject permit the egress of exhaled air from the antivirus helmet 100. By fitting snugly around the neck, the sleeve 170 can release exhaled air slowly, causing the antivirus helmet 100 to remain at slightly higher pressure than atmospheric pressure in the exterior environment of the antivirus helmet 100. By causing the antivirus helmet 100 to remain pressurized while in use, the sleeve 170 can effectively prevent the ingress of air from an exterior environment into the antivirus helmet 100. In some embodiments, the sleeve 170 can be formed from an elastic fabric that is breathable. In other embodiments, the sleeve 170 can be formed from a breathable fabric (elastic or otherwise) and can include an adjustment mechanism (not shown in FIG. 1A) that can permit adjusting the fit of the sleeve 170 to the neck of the subject. In yet other embodiments, the sleeve 170 can be formed from structured materials that permit the sleeve 170 to fit snugly around the neck and to obtain necessary air impedance. Regardless of its particular structure, the sleeve 170 provides softness and comfort, and also ensures an anatomical fit to the body.

Figure 2:
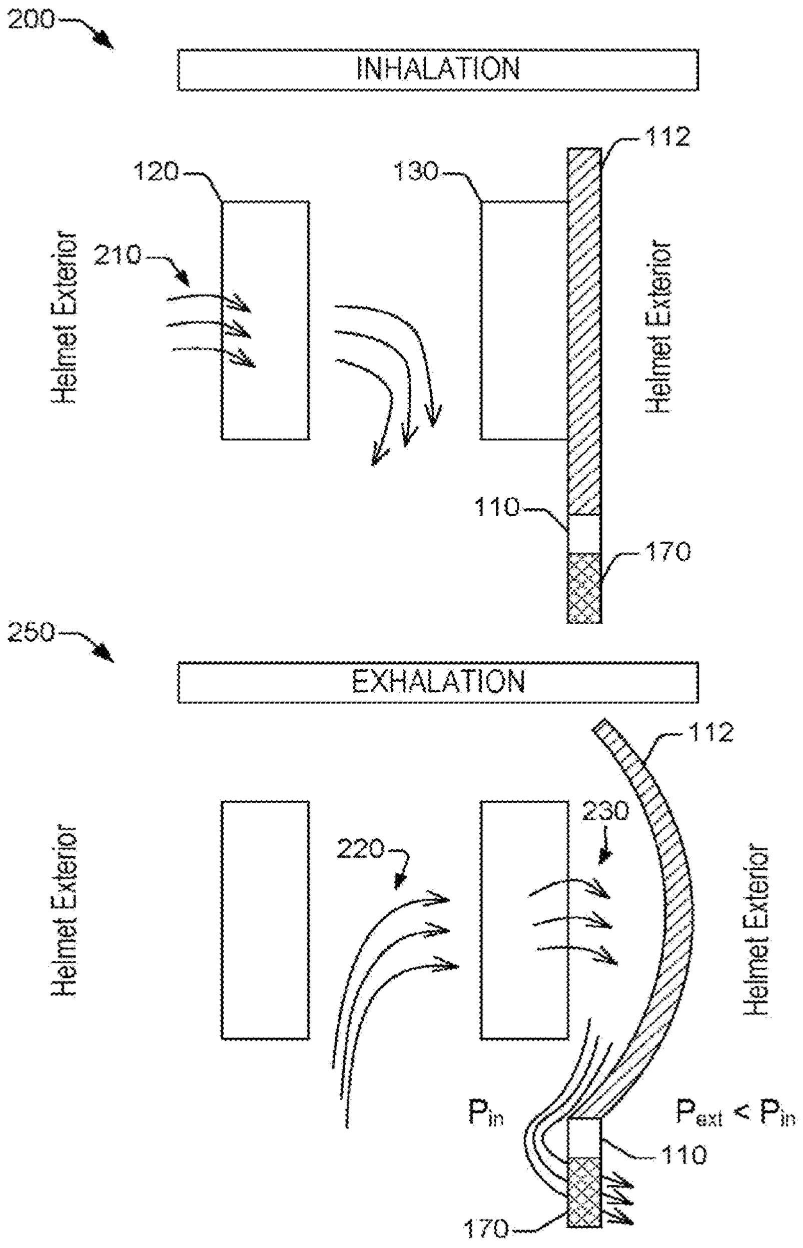
FIG. 2 schematically illustrates air flow during inhalation and exhalation while wearing an antivirus helmet in accordance with this disclosure.

It is noted that the only coupling between the antivirus helmet 110 and the exterior environment is provided by the inhalation filter unit 120 and the sleeve 170. A single pathway is thus formed for air to flow through the antivirus helmet 100. Specifically, as is illustrated in FIG. 2, air 210 from the exterior environment can ingress the antivirus helmet 100 through the inhalation filter unit 120; the air then travels through the respiratory airways to the lungs of the subject wearing the antivirus helmet 100; exhaled air 220 returns from the lungs, traversing the respiratory airways, and is filtered through the exhalation filter unit 130; filtered air 230 inflates a portion of the solid covering 110 and then egresses the antivirus helmet 110 through the sleeve 170. Inflation of the portion of the solid covering 110 forms an egress compartment that can be pressurized due to successive inflation resulting from breathing and slow egress of air through the sleeve 170. The portion of the solid covering 110 that is inflated is a flexible soft portion 112*a* of the solid covering 110 near the exhalation filter unit 130. During inhalation, that portion may be in contact with the exhalation filter unit 130, as is shown in diagram 200 in FIG. 2.

Figure 3:
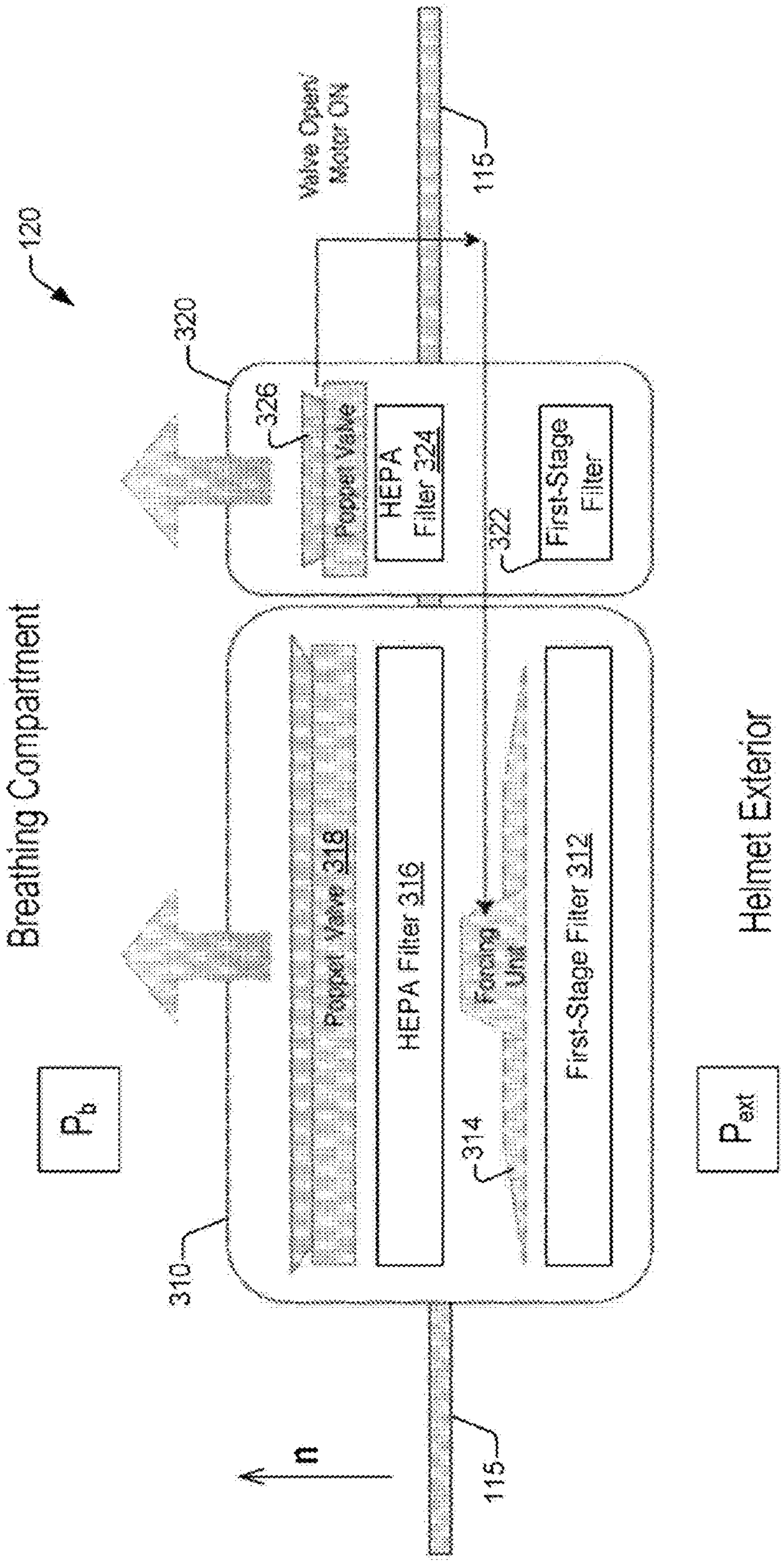
FIG. 3 illustrates a schematic cross-section view of an example of an inhalation filtering unit (IFU) of an antivirus helmet in accordance with one or more embodiments of this disclosure.
Figure 4:
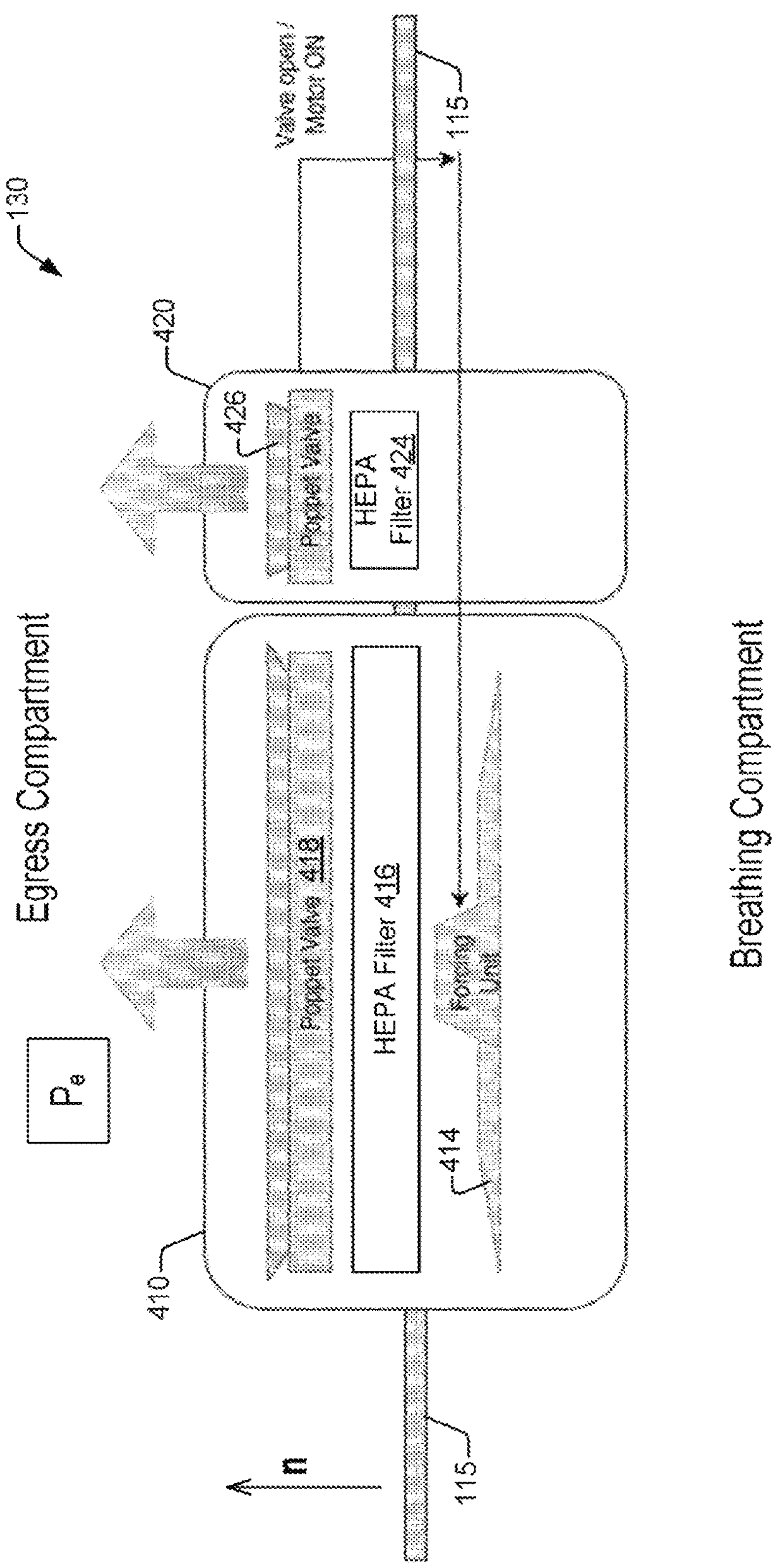
FIG. 4 illustrates a schematic cross-section view of an example of an exhalation filtering unit (EFU) of an antivirus helmet in accordance with one or more embodiments of this disclosure.

In situations in which high efficiency filter(s) are integrated into the inhalation filter unit 120, it may be difficult for a subject to breath while wearing the antivirus helmet 100. As such, the antivirus helmet 100 can include air-forcing units that can assist the subject with breathing. As is illustrated in FIG. 3 and FIG. 4, the inhalation filter unit 120 and the exhalation filter unit 130 can include respective air-forcing units. More concretely, in some embodiments, as is illustrated FIG. 3, the inhalation filter unit 120 can include a filtering assembly 310 and a differential pressure monitor device 320. The filtering assembly 310 includes a first-stage filter 312 that can clean coarse particulate matter from air that ingresses the inhalation filter unit 120 from the helmet exterior, Coarse particulate matter can include particles (solid or liquid) having a characteristic length of about 10 mm or greater in some arrangements, the first-state filter 312 can include randomly stacked fibers that trap the coarse particulate matter by means of electrostatic effects. In other arrangements, the first-stage filter 312 can include micro-structured or nanostructured arrangements of curved tubular fibers that can serve as centrifuges trapping the coarse particulate matter. Those fibers can be arranged in parallel in order to reduce impedance of the first-stage filter 312.

The filtering assembly 310 also includes an air-forcing unit 314 than can be energized in response to a reduction in pressure in a breathing compartment formed by the breathing module 115. Specifically, the differential pressure monitor device 320 can detect inhalation by means of a poppet valve 324. To that end, the differential pressure monitor device 320 can detect, using the poppet valve 324, a threshold negative change in pressure relative to pressure $P_{ext}$ in the helmet exterior. Specifically, a pressure $P_b$ in the breathing compartment that is less than $P_{ext}$ by at least a threshold amount $\Delta P_{b-ext}$ can cause the poppet valve 326 to open. As a result, the differential pressure monitor device 320 can detect inhalation. In one configuration, the magnitude of such a threshold change (or $\Delta P_{b-ext}$) can be about 10 Pa. In another configuration, the magnitude of $\Delta P_{b-ext}$) can be of the order of tens of Pa—e.g., 15 Pa, 20 Pa, 30 Pa, 40 Pa, 50 Pa, or similar. The disclosure is. of course, not limited to any of those configurations and, in some embodiments, other threshold amounts can be contemplated. Indeed, the threshold amount $\Delta P_{b-ext}$ is determined by the impedance of the poppet valve 326. The utilization of different poppet valves in respective differential pressure monitor devices can result in different magnitudes of the $\Delta P_{b-ext}$. It is noted that the magnitude of $\Delta P_{b\text{-}ext}$ can be configured to a value that is sufficiently large to mitigate false positives (e.g., inhalation is not initiated despite of $P_b$ satisfying an opening condition of the poppet valve) while sufficiently low to trigger the opening condition without straining the subject of the antivirus helmet 100. The latter may be relevant in situations in which the subject is an elderly or otherwise frail person.

The poppet valve 324 can be formed to have low impedance (e.g., about 10 Pa or less) in order to allow rapid opening and closing of the poppet valve 326. Regardless of its particular structure, as mentioned, the poppet valve 326 can open (represented with an arrow in FIG. 3) at a pressure $P_b$ that is equal to or exceeds $\Delta P_{b\text{-}ext}$, resulting in a signal being sent to the air-forcing unit 314. The signal causes a motor of the air-forcing unit 314 to transition from a power-off state to a power-on state. In some embodiments, rather than sending such a signal, the closing and opening of the poppet valve 326 can control the supply of an electric current to switching circuitry integrated into the filtering assembly 310. The switching circuitry can close and open a power circuit that supplies power to the air-forcing unit 314, thus causing the air-forcing unit 314 to transition between the power-off state and the power-on state. Specifically, in one example, the switching circuitry can be embodied in solid-state circuitry and can have a small form factor. Such a switching circuitry can include a coil that can receive the electric current from the differential pressure monitor device 320 when the poppet valve 326 is closed. In response, the coil can maintain a switch open, thus causing the power circuit to be open. Thus, the air-forcing unit 314 can remain in a power-off state. In response to the poppet valve 326 being open, the supply of electric current can be terminated. As a result, the coil can cause the power circuit to transition to the closed state. For instance, the absence of electric current through the coil can permit the closing of the switch, allowing the power circuit to supply power to the air-forcing unit 314. As the poppet valve 326 transition from open to closed, electric current resumes circulating through the coil and the switch opens, thus causing the power circuit to terminate the supply of power to the air-forcing unit 314.

In the power-on state, the air-forcing unit 314 can push air emanating from the first-state filter 312 towards a HEPA filter 316 integrated into the filtering assembly 310. The HEPA filter 316 can be formed to have low impedance (approximately 60 Pa, for example). A power supply (not depicted in FIG. 3) connected to the air-forcing unit 314 can energize the motor. The power supply can be integrated into or otherwise coupled to the antivirus helmet 100 and can include a set of rechargeable batteries, for example. Those batteries can be charged by an external source connected to a universal serial bus (USB) port in the antivirus helmet 100, or by means of a solar-cell panel integrated into the antivirus helmet 100.

The HEPA. filter 316 can filter fine particulate matter including particles having characteristic length of about 0.3 μm or greater. In some arrangements, the HEPA filter 316 can include randomly stacked fibers that trap the fine particulate matter by means of electrostatic effects. Such fibers can have a thickness of about 20 μm, for example, in other arrangements, the HEPA filter 316 can include micro-structured or nanostructured arrangements of curved tubular fibers that can serve as centrifuges trapping the coarse particulate matter. Those fibers can be arranged in parallel in order to reduce impedance of the HEPA filter 316. By forming structured filtering elements, the HEPA filter 316 (or any other high-efficiency included in the inhalation filter unit 120) can increase filtering efficiency of viruses, bacteria, or other types of pathogens. Further, structured filtering elements can reduce (or even minimize) aerodynamic flow impedance, improving the power consumption and overall performance of the air-forcing unit 314.

The filtering assembly 310 also includes a poppet valve 318 that, in some embodiments, also can open (represented with an arrow in FIG. 3) at the threshold negative change in pressure, relative to pressure $P_{ext}$, that causes the poppet valve 326 to open. As such, the poppet valve 318 and the poppet valve 326 can open essentially simultaneously. The opening of the poppet valve 318 can permit filtered air emanating from the HEPA filter 316 to ingress into the breathing compartment formed by the breathing module 115. The poppet valve 318 can be formed to have low impedance (e.g., about 10 Pa or less) in order to allow rapid opening and closing of the poppet valve 318. It is noted that, in some embodiments, the poppet valve 318 can have an impedance that is less than the impedance of the poppet, valve 326. Thus, the poppet valve 318 can open, in response to $P_b$ being less than $P_{ext}$ by at least a threshold amount $\Delta P_{b\text{-}ext}'$ that is less than $\Delta P_{b\text{-}ext}$.

As is illustrated in FIG. 3, the differential pressure monitor device 320 also can include a first-state filter 322 and a HEPA filter 324. Those filters can clean inhaled air, maintaining a clean environment, within the breathing compartment while controlling the duty cycle of the air-forcing unit 314. The HEPA filter 324 can be formed to have low impedance (approximately 60 Pa, for example).

In some embodiments, the filtering assembly 310 can have an essentially cylindrical shape having a first essentially planar circular face and a second essentially planar circular face opposite the first face. The first and second faces can be essentially perpendicular to a direction n essentially normal to a surface of the breathing, module 115 in proximity to the inhalation filter unit 120. In those embodiments, the poppet valve 318 also can be essentially cylindrical and can have a nearly uniform first thickness along the direction n. The first thickness can have a magnitude in a range from 1 mm to 3 mm, for example. The HEPA filter 316 also can be essentially cylindrical and can have a nearly uniform second thickness along the direction n. The second thickness can have a magnitude in a range from 1 mm to 2 mm, for example. The first-stage, filter 312 also can be essentially cylindrical and can have a nearly uniform third thickness along the direction n. The third thickness can have a magnitude in a range from 1 mm to 2 mm, for example. The air-forcing unit 314 also can be essentially cylindrical having a common cylindrical axis with the filtering assembly 310. A diameter of the air-forcing unit 314 can have a magnitude in a range from 20 mm to 50 mm, for example. The air-forcing unit 314 can have a nearly uniform fourth thickness along the direction n. The fourth thickness can have a magnitude in a range from 10 mm to 20 mm, for example.

The ranges of the foregoing first, second, third, and fourth thicknesses in the filtering assembly 310 are simply illustrative. Other ranges for one or more of such thicknesses can be contemplated with forming the filtering assembly 310. Similarly, the range of the diameter of the air-forcing unit 314 also is illustrative and other ranges can be contemplated. Further, the filtering assembly 310 is not limited to being cylindrical. In other embodiments, the filtering assembly unit 310 can have an essentially cuboidal shape. Other form factors also can be contemplated.

In addition, or in other embodiments, the differential pressure monitor device 320 can have an essentially cylindrical shape having a first essentially planar circular face and a second essentially planar circular face opposite the first face. The first and second faces can be essentially perpendicular to a direction n essentially normal to a surface of the breathing module 115 in proximity to the inhalation filter unit 120. In those embodiments, the poppet valve 326 also can be essentially cylindrical and can have a nearly uniform first thickness along the direction n. The first thickness can have a magnitude in a range from 1 mm to 10 mm, for example. The HEPA filter 324 also can be essentially cylindrical and can have a nearly uniform second thickness along the direction n. The second thickness can have a magnitude in a range from 1 mm to 2 mm, for example. The first-stage filter 322 also can be essentially cylindrical and can have a nearly uniform third thickness along the direction n. The third thickness can have a magnitude in a range from 1 mm to 2 mm, for example.

The ranges of the foregoing first, second, and third thicknesses in the differential pressure monitor device 320 are simply illustrative. Other ranges for one or more of such thicknesses can be contemplated with forming the differential pressure monitor device 320. Further, the differential pressure monitor device 320 is not limited to being cylindrical. In other embodiments, the differential pressure monitor device 320 can have an essentially cuboidal shape. Other form factors also can be contemplated.

Further, in some embodiments, as is illustrated FIG. 4, the exhalation filter unit 130 can include a filtering assembly 410 and a differential pressure monitor device 420, The filtering assembly 410 can receive exhaled air. The filtering assembly 410 includes an air-forcing unit 414 than can be energized in response to a defined increase in pressure in an egress compartment formed by the expansion of the elastic covering 112 (see diagram 250 in FIG. 2, "Exhalation" section, for example). Specifically, the differential pressure monitor device 420 can detect exhalation by means of a poppet valve 426. To that end, the differential pressure monitor device 420 can detect, using the poppet valve 426, a threshold positive change in pressure relative to residual pressure $P_5$ in the egress compartment of the antivirus helmet 100. Specifically, because a single pathway is available for air to circulate through the antivirus helmet 100, the pressure that can cause the opening of the poppet valve 426 is a pressure $P_b$ that exceeds $P_5$ by at least a threshold amount $\Delta P_{b-5}$. As a result, the differential pressure monitor device 420 can detect exhalation in response to the poppet valve 426 opening at such a pressure. In one configuration, the magnitude of such a threshold change can be about 10 Pa. The disclosure is, of course, not limited in this respect and, in some configurations, other threshold amounts can be contemplated. Indeed, the threshold amount $\Delta P_{b-5}$ can be determined by the impedance of the poppet valve 426. The utilization of different poppet valves in respective differential pressure monitor devices can result in different magnitudes of the $\Delta P_{b-5}$.

The poppet valve 426 can be formed to have low impedance (e.g., about 10 Pa or less) in order to allow rapid opening and closing of the poppet valve 426. Regardless of its particular structure. as mentioned, the poppet valve 426 can open (represented with an arrow in FIG. 4) at a pressure $P_b$ that is equal to or exceeds $\Delta P_{b-5}$, resulting in a signal being sent to the air-forcing unit 414. The signal causes a motor of the air-forcing unit 414 to transition from a power-off state to a power-on state. In some embodiments, rather than sending such a signal, the closing and opening of the poppet valve 426 can control the supply of an electric current to switching circuitry integrated into to the filtering assembly 410. The switching circuitry can close and open a power circuit that supplies power to the air-forcing unit 414, thus causing the air-forcing unit 414 to transition between the power-off state and the power-on state. Specifically, in one example, the switching circuitry can be embodied in solid-state circuitry and can have a small form factor. Such a switching circuitry can include a coil that can receive the electric current from the differential pressure monitor device 420 when the poppet valve 426 is closed. In response, the coil can maintain a switch open, thus causing the power circuit to be open. Accordingly, the air-forcing unit 314 can remain in a power-off state. In response to the poppet valve 426 being open, the supply of electric current can be terminated. As a result, the coil can cause the power circuit to transition to the closed state. To that point, the absence of electric current through the coil can permit the closing of the switch, allowing the power circuit to supply power to the air-forcing unit 414. As the poppet valve 426 transition from open to closed, electric current resumes circulating through the coil and the switch opens, thus causing the power circuit to terminate the supply of power to the air-forcing unit 414.

In the power-on state, the air-forcing unit 414 can push exhaled air received at the filtering assembly 410 towards a HEPA filter 416 integrated into the filtering assembly 410. A power supply (not depicted in FIG. 4) connected to the air-forcing unit 414 can energize the motor. In some embodiments. such a power supply can be the same power supply that can energize the air-forcing unit 314 (FIG. 3). in other embodiments, the power supply that energizes the air-forcing unit 414 can be separate and can include a set of rechargeable batteries, for example. Those batteries can be charged by an external source connected to a USB port in the antivirus helmet 100, or by means of a solar-cell panel integrated into or otherwise coupled to the antivirus helmet 100.

The HEPA filter 416 can filter fine particulate matter including particles having characteristic length of about 0.3 μm or greater. In some arrangements. the HEPA filter 416 can include randomly stacked fibers that trap the fine particulate matter by means of electrostatic effects. Such fibers can have a thickness of about 20 μm, for example. In other arrangements, the HEPA filter 416 can include micro-structured or nanostructured arrangements of curved tubular fibers that can serve as centrifuges trapping the coarse particulate matter. Those fibers can be arranged in parallel in order to reduce impedance of the HEPA filter 416. By forming structured filtering elements, the HEPA filter 416 (or any other high-efficiency included in the exhalation filter unit 130) can increase filtering efficiency of viruses, bacteria, or other types of pathogens. Further, structured filtering, elements can reduce (or even minimize) aerodynamic flow impedance, improving the power consumption and overall performance of the air-forcing unit 414.

The filtering assembly 410 also includes a poppet valve 418 that, in some embodiments, also can open (represented with an arrow in FIG. 4) at the threshold positive change in pressure that causes the poppet valve 426 to open. The opening of the poppet valve 418 can permit filtered air emanating from the HEPA filter 316 to ingress into the breathing compartment formed by the breathing module 115. It is noted that, in some embodiments, the poppet valve 418 can have an impedance that is either greater than or less than the impedance of the poppet valve 426. Thus, the poppet valve 418 can open in response to a pressure P that exceeds $P_5$ by at least a threshold amount $\Delta P'_{b-5}$ different from $\Delta P_{b-5}$.

As is illustrated in FIG. 4, the differential pressure monitor device 420 also can include a HEPA filter 424 that can clean exhaled air, thus maintaining a clean environment withing the egress compartment while controlling the duty cycle of the air-forcing unit 414. The HEPA filter 424 can be formed to have low impedance (approximately 60 Pa, for example). It is noted that as the antivirus helmet 100 is worn, the impedance of the HEA filter 424 can increase as a result of the HEPA filter 424 trapping particulate matter, including viruses, bacteria, or other types of pathogens. In some situations, such an impedance can increase to approximately 200 GPa.

In some embodiments, the filtering assembly 410 can have an essentially cylindrical shape having a first essentially planar circular face and a second essentially planar circular face opposite the first face. The first and second faces can be essentially perpendicular to a direction n essentially normal to a surface of the breathing module 115 in proximity to the inhalation filter unit 120. In those embodiments, the poppet valve 418 also can be essentially cylindrical and can have a nearly uniform first thickness along the direction n. The first thickness can have a magnitude in a range from 1 mm to 3 mm, for example. The HEPA filter 416 also can be essentially cylindrical and can have a nearly uniform second thickness along the direction n. The second thickness can have a magnitude in a range from 1 mm to 2 mm, for example. The air-forcing unit 414 also can be essentially cylindrical having a common cylindrical axis with the filtering assembly 310. diameter of the air-forcing unit 414 can have a magnitude in a range from 20 mm to 50 mm, for example. The air-forcing unit 414 can have a nearly uniform third thickness along the direction n. The fourth thickness can have a magnitude in a range from 10 mm to 20 mm, for example.

The ranges of the foregoing first, second, and third thicknesses in the filtering assembly 410 are simply illustrative. Other ranges for one or more of such thicknesses can be contemplated with forming the filtering assembly 410. Similarly, the range of the diameter of the air-forcing unit 414 also is illustrative and other ranges can be contemplated. Further, the filtering assembly 410 is not limited to being cylindrical. In other embodiments, the filtering assembly unit 310 can have an essentially cuboidal shape. Other form factors also can be contemplated.

In addition, or in other embodiments, the differential pressure monitor device 420 can have an essentially cylindrical shape having a first essentially planar circular face and a second essentially planar circular face opposite the first face. The first and second faces can be essentially perpendicular to a direction n essentially normal to a surface of the breathing module 115 in proximity to the inhalation filter unit 120. In those embodiments, the poppet valve 426 also can be essentially cylindrical and can have a nearly uniform first thickness along the direction n. The first thickness can have a magnitude in a range from 1 mm to 10 mm, for example. The HEPA filter 424 also can be essentially cylindrical and can have a nearly uniform second thickness along the direction n. The second thickness can have a magnitude in a range from 1 mm to 2 mm, for example.

The ranges of the foregoing first and second thicknesses in the differential pressure monitor device 420 are simply illustrative. Other ranges for one or more of such thicknesses can be contemplated with forming the differential pressure monitor device 420. Further, the differential pressure monitor device 420 is not limited to being cylindrical. In other embodiments, the differential pressure monitor device 420 can have an essentially cuboidal shape. Other form factors also can be contemplated.

As mentioned, the antivirus helmet 100 provides a single pathway for air to flow through the antivirus helmet 100. Air that is inhaled from the helmet exterior air passes through the inhalation unit 120 into a breathing compartment and can continue to the lungs of the subject wearing the antivirus helmet 100. Exhaled air enters the breathing compartment and passes through the exhalation filer unit 130 into an egress compartment formed by inflation of a soft portion 112*a* of the solid covering 110. Exhaled air egresses from the egress compartment through the sleeve 170.

The breathing compartment and the egress compartment are arranged in tandem. Each of those compartments maintain respective pressure that permit, individually or in combination, efficient operation of the air-forcing units integrated into the inhalation filter unit 120 and the exhalation filter unit 130. Efficient operation can result in efficient use of power provided by one or several power supplies integrated into the antivirus helmet 100.

Figure 5:
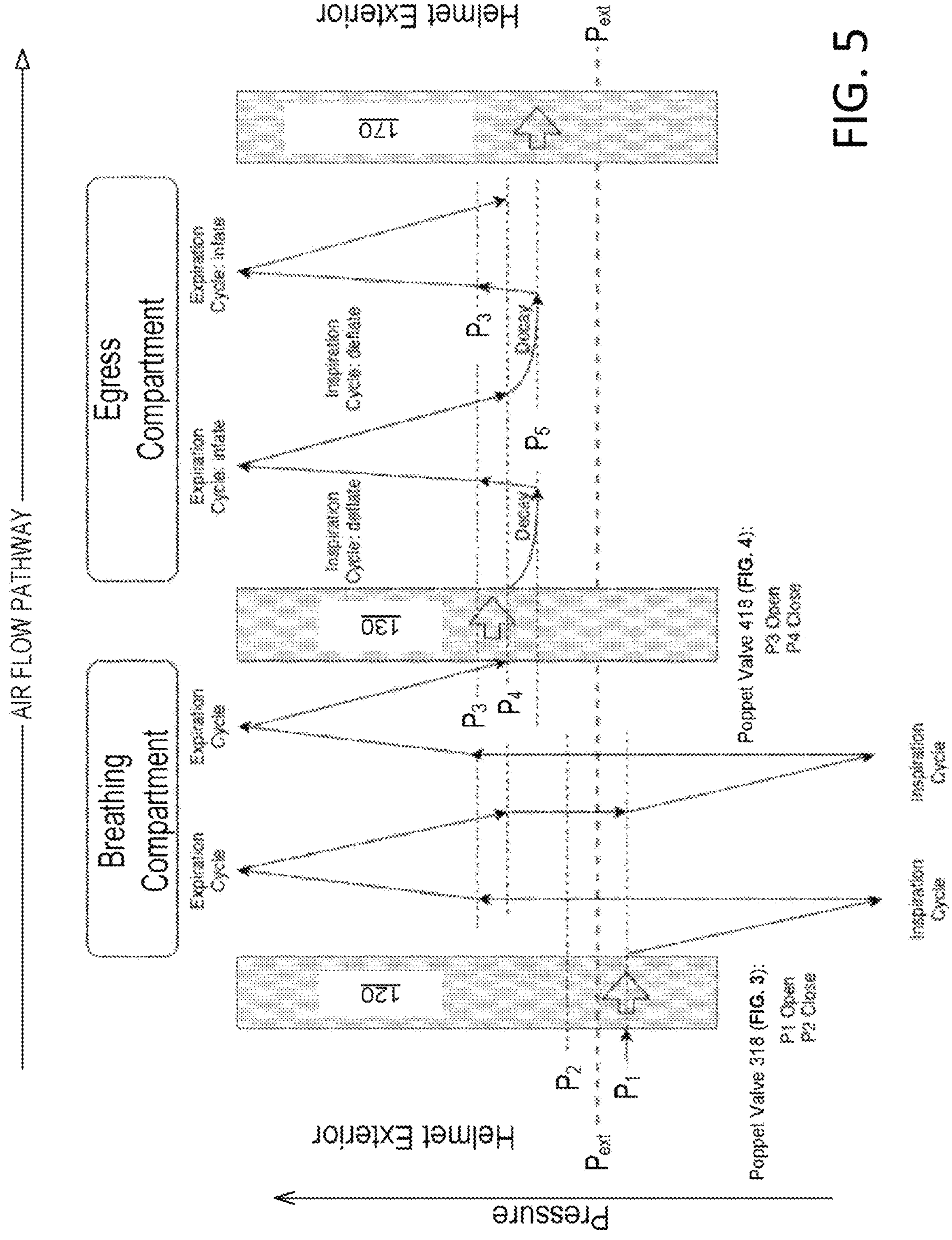
FIG. 5 illustrates an example of a helmet pressure profile during inhalation and exhalation, in accordance with one or more embodiments of this disclosure.

As is illustrated in FIG. 5, as air from the helmet exterior is inhaled, pressure at the breathing compartment is reduced relative to pressure $P_{ext}$ in the helmet exterior. For instance, $P_{ext}$ can be atmospheric pressure. Poppet valves (e.g., poppet valve 318 and poppet valve 326) integrated into the inhalation filter unit 120 can open upon the pressure reaches a pressure $P_1$. In response, the inhaled air passes through, and is cleaned by, the inhalation filter unit 120. The cleaned air can traverse the respiratory airways of the subject wearing the antivirus helmet 100, reaching the lungs. Air can then be exhaled. Expiration results in an increase in pressure at the breathing compartment. When pressure increases to $P_2$, the poppet valves integrated into the inhalation filter unit 120 can close, thus ensuring that exhaled air flows towards the egress compartment, not the helmet exterior. As expiration continues, pressure in the breathing compartment can reach a pressure $P_3$. In response, poppet valves (e.g., poppet valve 418 and poppet valve 426) integrated into the exhalation filter unit 120 can open, resulting in exhaled air being cleaned and the egress compartment being inflated. Pressure then is reduced in the breathing compartment and is increased in the egress compartment. As pressure is reduced to a pressure $P_4$, the poppet valves integrated into the exhalation filter unit can close, resulting in progressive deflation (denoted as "decay" in FIG. 5) of the egress compartment. Cleaned exhaled air can egress to the helmet exterior through the sleeve 170. Rather than reaching Pext, pressure in the egress compartment remains at a pressure $P_5 > P_{ext}$ after deflation.

The materials and components that form the antivirus helmet 110 can cause sound attenuation. Accordingly, back to referring to FIG. 1A, the antivirus helmet 100 can include an audio input unit 150 and an audio output unit 160. The audio input unit 150 can receive ambient sound and can process signals representative of the ambient sound in order to provide audible sound to the subject wearing the antivirus helmet 100. The audio input unit 150 can include, for example, microphone(s), analog-to-digital converter(s), amplifier(s), filter(s), and/or other circuitry for processing of audio (such as equalizer(s)). The audio output unit 160 can include a group of audio output devices (e.g., a piezoelectric speaker) and circuitry that permit generating and emitting audible signals (speech, utterances, etc.) to the exterior environment of the antivirus helmet 100. Such circuitry can include, in some cases, digital-to-analog converters; volume control(s) and/or other audio controls. The disclosure is not limited in that respect, and the antivirus helmet 100 can include another number of audio input units and/or another number of audio output units.

As is shown in FIG. 1C, in some embodiments, the antivirus helmet 100 can include tubing 180 connected to one or several receptacles (not depicted in FIG. 1C). The receptacles can contain one or several types of liquids, such as water, juice, soda pop, medicine, a combination of the foregoing, or similar. The tubing 180 can permit extracting liquid from the receptacle(s). Accordingly, in those embodiments, a subject wearing the antivirus helmet 100 can remain hydrated and/or medicated for extended periods, without a need to remove the antivirus helmet 100. Simply as an illustration, in one configuration, a receptacle connected to the tubing 180 can be embodied in a water bladder and the tubing 180 can include flexible plastic tubing connected to the water bladder. In that configuration, a subject wearing the antivirus helmet 100 can drink water from the water bladder by means of the flexible plastic tubing. In addition, or in another configuration. another one of the receptacles connected to the tubing 180 can be embodied in a sachet containing liquid medicine that may be needed by the subject wearing the antivirus helmet 100. In that case, the tubing 180 can include second plastic tubing connected to the sachet. The second plastic tubing can permit the subject to ingest a dose of medicine from the sachet.

Figure 1D:
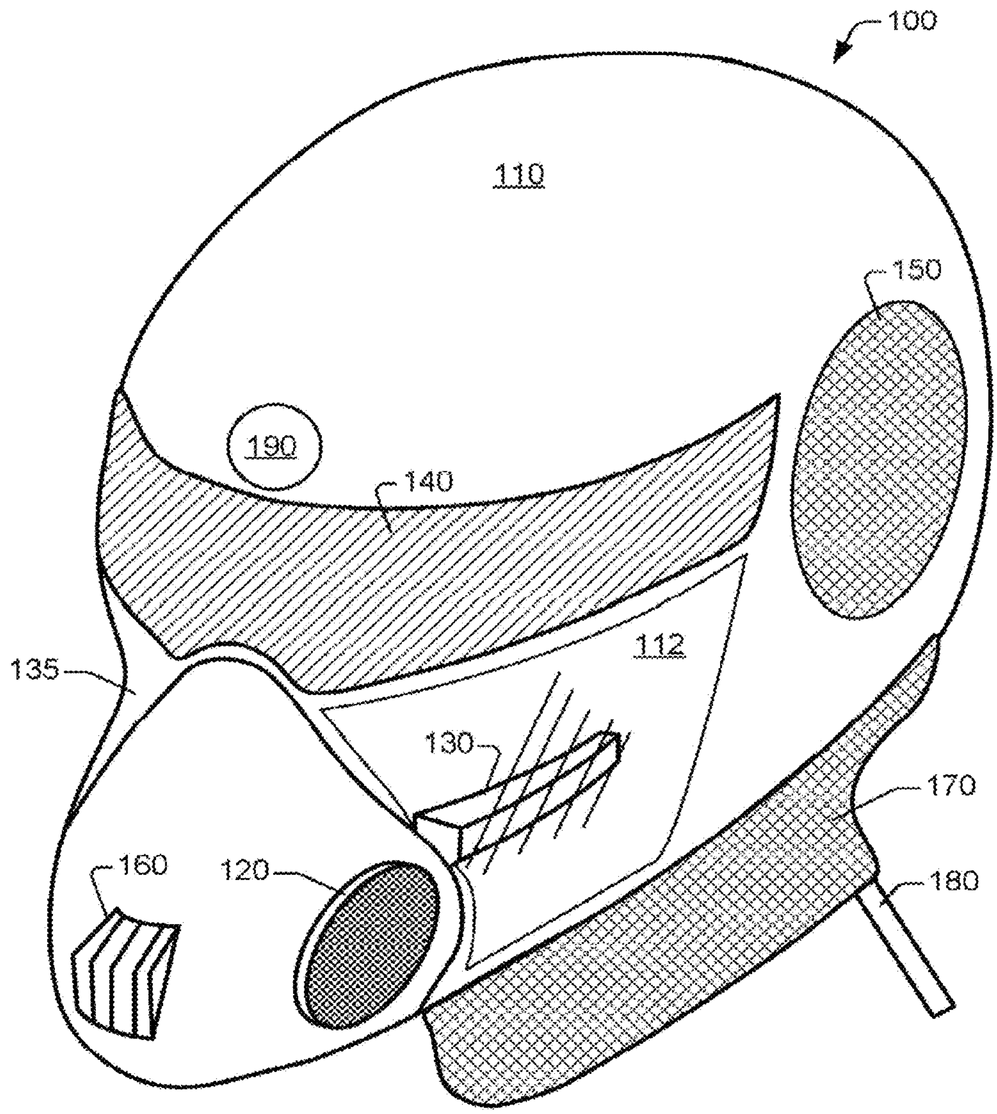
FIG. 1D illustrates a perspective view of another example of an antivirus helmet in accordance with one or more embodiments of this disclosure.

It is noted that other structures can be contemplated for the solid covering 110. At least one of those other structures can permit assembling one or more of the functional elements of the antivirus helmet 100 in various fashions. As an illustration. in some embodiments. as is illustrated in FIG. 1D, the solid covering 110 can define an opening that can receive the pane 140. For instance, the pane 140 can be mounted to the solid covering 110 to cover the opening. The pane 140 can be mounted to the solid covering 110 in accordance with various aspects described herein. A hermetic seal can be formed after mounting the pane 140 to the solid covering 110. The solid covering also can define a second opening that can receive the breathing module 115. For instance, the breathing module 115 can be mounted to the solid covering 110 to cover the second opening. The breathing module 115 can be mounted to the solid covering 110 in accordance with various aspects described herein. A hermetic seal can be formed after mounting the breathing module 115 to the solid covering 110. The solid covering can further define a third opening that can receive the elastic covering 112. As mentioned, due to bilateral symmetry of a subject wearing the antivirus helmet 100, the solid covering 110 also can define a fourth opening symmetrically opposite, and symmetrically arranged relative to, the third opening. The fourth opening also can receive another elastic covering 112. The elastic covering 112 can be mounted to the solid covering 110 to cover the third opening. When present, another elastic covering 112 also can be mounted to the solid covering 110 to cover the fourth opening. Elastic covering(s) 112 can be mounted to the solid covering 110 in accordance with various aspects described herein. A hermetic seal can be formed after mounting the elastic covering(s) 112 to the solid covering 110.

In some embodiments, the antivirus helmet 100 can, be functionally coupled to one or more peripheral devices. Such a coupling can be wireless or can be accomplished by means of a wireline connection. To that end, the antivirus helmet 100 can include a radio unit or a set of ports, or both, that can permit coupling peripheral device(s) to the antivirus helmet 100. The radio unit can operate in a variety of wireless environments having wireless signals transmitted in different electromagnetic radiation (EM) frequency bands. The radio module can include one or more antennas and a communication processing unit that can process (code, decode, format, etc.) wireless signals within a set of one or many EM frequency bands. The EM frequency band(s) can include one or several radio frequency (RF) portions of the EM spectrum; microwave portion(s) of the EM spectrum; or infrared (IR) portion of the EM spectrum. The EM frequency band(s) can include at least one of (i) all or most licensed EM frequency bands, or (ii) all or most unlicensed frequency bands currently available for telecommunication. A combination of receiving (RX) antennas) and the communication processing unit can constitute a receiver of the radio module. The communication processing unit can include coder(s), decoder(s), multiplexer(s), demultiplexer(s), and similar components. A combination of transmitting (TX) antenna(s) and the communication processing unit can constitute a transmitter of the radio module. Transmitter and receiver form a transceiver of the radio unit. Such a radio unit can operate according to a communication mode determined by a radio technology protocol. In some cases, the radio unit can permit wireless communication according to a point-to-point radio protocol, such as WI-Fi, Bluetooth, Zigbee, or similar. In addition, or in other cases, the radio unit can permit wireless communication according to a cellular radio protocol (e.g., LTE, 4G, or 5G).

In some configurations, a display device (not depicted in FIG. 1C) can be mounted to the antivirus helmet 100 and a mobile computing device can be paired with the antivirus helmet 100. The mobile computing device can be embodied in a smartphone, a tablet computer, or a handheld gaming console, for example. The mobile computing device can provide digital media for entertainment of the subject wearing the antivirus helmet 100. For example, feature films, video segments, songs or digital radio content, a combination thereof, or similar. In other situations, the antivirus helmet 100 can include a camera (either integrated into the antivirus helmet 100 or coupled thereof as a peripheral device) and the digital media can be added to a video feed obtained by the camera. Thus, the added digital media can provide augment reality (AR) elements that can be used to accomplish a particular task and/or to navigate a harsh industrial environment or a contaminated medical environment. For instance, AR features can be used by maintenance crews when working in a hospital setting where infected patients are being treated.

As is disclosed herein, some functionality of the antivirus helmet 100 can consume power, which can be supplied by one or several rechargeable batteries. Such functionality can be toggled on by means of a power button 190 (see FIG. 1C, for example) or another type of interface element (e.g., a touch-sensitive surface). Although the power button 190 is illustrated as being circular, other shapes and sizes of the power button can be contemplated. In some configurations, a surface of the power button can include a logotype or other types of branding indicia corresponding to a manufacturer of the antivirus helmet 100. In addition, or in other configurations, the power button can include markings identifying a subject that wears the antivirus helmet 100. Such markings can be configurable using, for example, a control component (not depicted in FIG. 1C) coupled to or otherwise integrated into the antivirus helmet 100. The control component can execute program code (e.g., control logic) to configure such markings. The control component can be embodied in, or can include, for example, a microcontroller, a PLC, or another type of processor.

Figure 6:
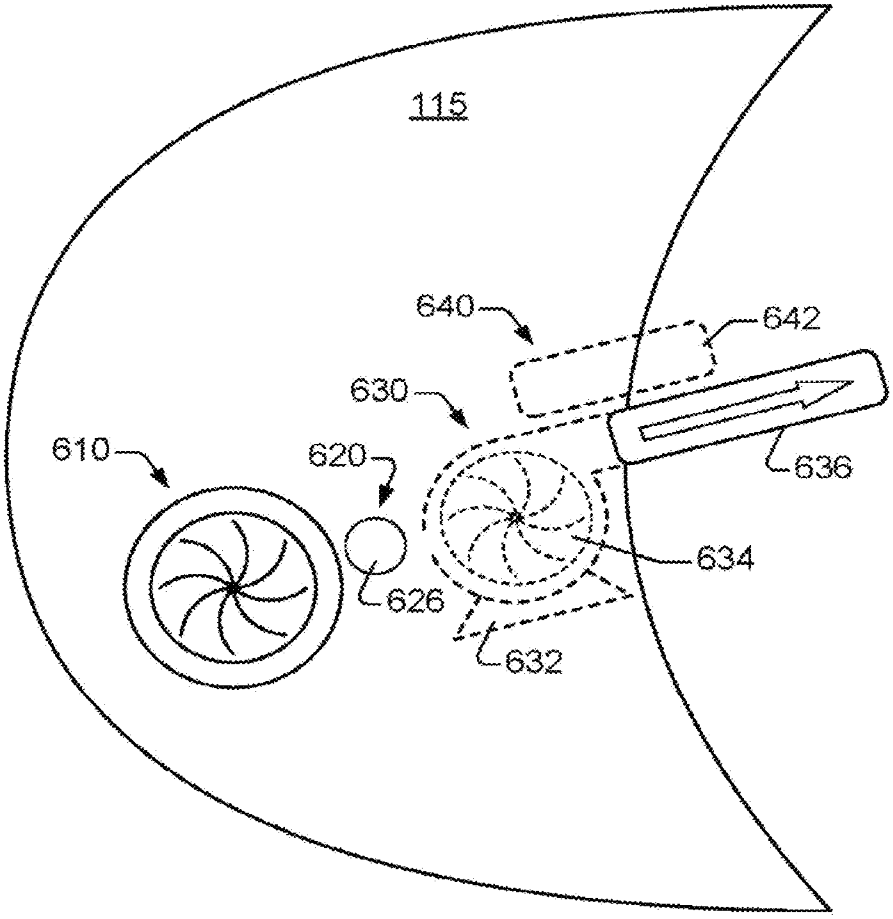
FIG. 6 illustrates an example of a breathing module coupled to an IFU and an EFU, in accordance with one or more embodiments of this disclosure.

FIG. 6 illustrates an example of a breathing module coupled to an IFU 120 and an ETU 130, in accordance with one or more embodiments of this disclosure. As is illustrated, the inhalation filter unit 120 includes a filtering assembly 610 and a differential pressure monitor device 620. The filtering, assembly 610 and the differential pressure monitor device 620 are arranged to permit passage of air from the helmet exterior into the breathing compartment formed, in part, by the breathing module 115. Similar to the filtering assembly 310 (FIG. 3), the filtering assembly 610 includes an axial ventilator that serves as a forcing unit that can push inhaled air through a HEP filter integrated into the filtering assembly 610. The HEPA filter and the poppet valve can be essentially cylindrical, and can be arranged in a stack having a cylindrical axis essentially aligned with axis of the axial ventilator 612. In contrast to the filtering assembly 310 (FIG. 3), in some embodiments, a first-stage filter can be excluded from the filtering, assembly 610.

The differential pressure monitor device 620 includes a poppet valve 626. The poppet valve 626 can be essentially cylindrical. Similar to the differential pressure monitor device 320 (FIG. 3), the differential monitor device 620 also includes a HEPA filter. The HEPA filter can be essentially cylindrical. The poppet valve 626 and the HEPA filter can be arranged in a stack having an essentially common cylindrical axis. In contrast to the differential pressure monitor device 320 (FIG. 3), in some embodiments, a first-stage filter can be excluded from the differential pressure monitor device 620.

As is also illustrated in FIG. 6, the exhalation filter unit 130 includes a filtering assembly 630 and a differential pressure monitor device 640. The filtering assembly 610 and the differential pressure monitor device 620 are arranged to permit passage of exhaled air from the breathing compartment into the egress compartment formed as a result of the expansion of the elastic covering 112 (not depicted in FIG. 6, see FIG. 1). The exhalation filter unit 130 can be partially assembled in the interior of the breathing compartment, permitting the exhaled air to flow essential parallel to the interior surface of the breathing compartment. The filtering assembly 630 can include an inlet member 632 defining an opening to receive exhaled air, and an outlet member 636 defining an opening that permits passage of clean exhaled air (represented with an open arrow) into the egress compartment.

Similar to the filtering assembly 410 (FIG. 4), the filtering assembly 630 includes a centrifugal ventilator 634 that serves as the forcing unit 414 (FIG. 4) that can push exhaled air through a HEP filter integrated into the filtering assembly 630. The filtering assembly 630 also includes a poppet valve 636. The differential pressure monitor device 640 includes a poppet valve 642. The poppet valve 642 can have an essentially cuboidal shape. Similar to the differential pressure monitor device 420 (FIG. 4), the differential monitor device 640 also includes a HEPA filter. The HEPA filter also can have an essentially cuboidal shape. The poppet valve 636 and the HEPA filter can have respective first rectangular faces of an essentially same size. The poppet valve 636 and the HEPA filter can be arranged in a stack along a direction essentially perpendicular to the first rectangular faces.

The differential pressure monitor device 640 includes a poppet valve 642. The poppet valve 642 can have an essentially cuboidal shape. Similar to the differential pressure monitor device 420 (FIG. 4). the differential monitor device 640 also includes a HEPA filter. The HEPA filter also can have an essentially cuboidal shape. The poppet valve 642 and the HEPA filter can have respective first rectangular faces of an essentially same size, and can be arranged in a stack along a direction essentially perpendicular to the first rectangular faces. Such a direction can be essentially parallel to an interior surface of the breathing compartment.

Figure 7A:
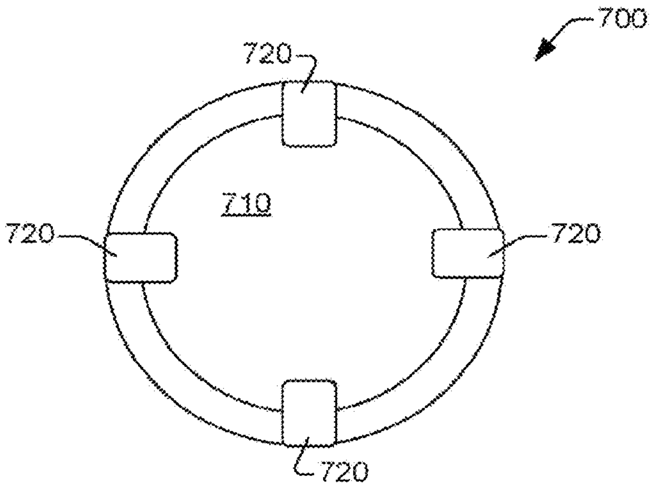
FIG. 7A illustrates a top view of an example of a poppet valve that can be integrated into an IFU or an EFU, or both, in accordance with one or more embodiments of this disclosure.
Figure 7B:
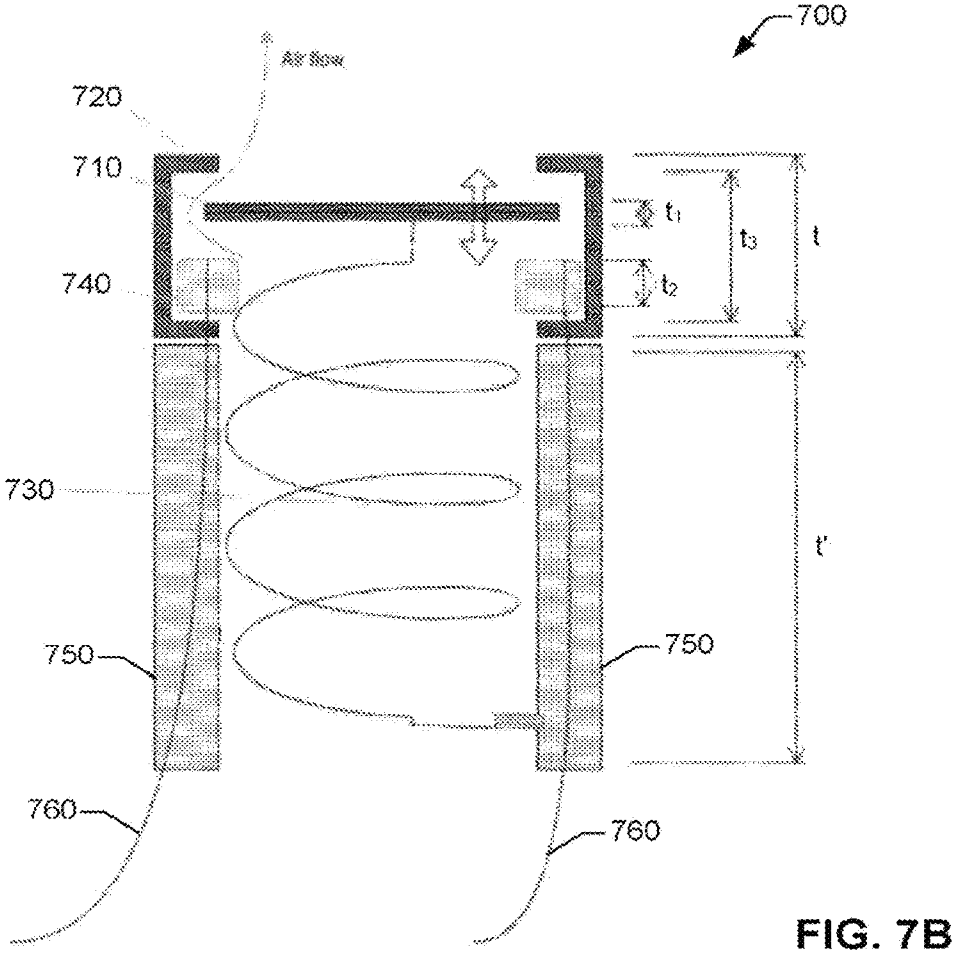
FIG. 7B illustrates a cross-sectional view of the example poppet valve shown in FIG. 7A.

FIGS. 7A and 7B illustrate an example of a poppet valve 700 that can be integrated into an WU 120 or an EFU 130, or both. in accordance with one or more embodiments of this disclosure. As is illustrated in FIG. 7A, the example poppet valve 700 can have a circular section and can include a metal disc 710 and a group of holding members 720. The metal disc 710 has a diameter d and a thickness $t_1$. The diameter d can have a magnitude in a range from about 20 mm to 40 mm, and the thickness $t_1$ can have a magnitude in a range from about 50 μm to about 2 mm, for example. While four holding members 720 are shown, the disclosure is not so limited and the group of holding member 720 can include any other number of holding member 720.

Each holding member 720 can have a length t (FIG. 7B) along the cylindrical axis of the poppet valve 700. The length t can be the same across the holding members in the group of holding members 720. The length t can have a magnitude in a range from about 2 mm to about 5 mm.

The group of holding member 720 can be attached to an annular body 750. The annular body 750 can be formed from silicone or another type of plastic that has greater rigidity than silicone. Simply for illustration purposes, rigidity can be dictated by one or more Young module, sheer modulus, or tensile strength. The annular body 750 has a length t' along the cylindrical axis of the annular body 750. The length t' can have a magnitude in a range from about 5 mm to about 15 mm.

As is illustrated in FIG. 7B, the metal plate 710 can be attached to an elastic member 730 that, in turn, is attached to the annular body 750. The elastic constant of the elastic member 730 can determine the impedance of the poppet valve 700, and thus, the pressure at which the poppet valve 700 can open. The elastic member 730 is represented with a spring simply for purposes of illustration and not limitation.

In addition, the poppet valve 700 also includes a silicone washer 740 where the metal plate 710 can rest when the poppet valve 700 is closed. The silicon washer 740 has a thickness $t_2$ along a direction along the cylindrical axis of the silicone washer 740. The thickness $t_2$ can have a magnitude in a range from about 50 μm to about 1 mm. A washer of other non-conducting material also can be contemplated. A group of conductive conduits 760 can be coupled to the silicone washer 740 at respective portions of the silicone washer 740. Each one of those portions can be diametrically opposed. The conductive conduits 760 can be embodied in, or can include. metal wires, metal pads, or similar. As is illustrated in FIG. 7B, the range of motion of the metal plate 710 between an open state and a closed state of the poppet valve 700 can be $t_3-(t_1+t_2)$. The range of motion can be of the order of one millimeter (e.g., 1 mm, 2 mm, 3 mm).

As it is illustrated in FIG. 7B, a length of the poppet valve 700 can be defined by the length t and the length t' of the annular body 750. In some embodiments the length of the poppet valve 700 can have magnitude in a range from 10 mm to 30 mm.

It is noted that in some embodiments, the poppet valve 700 may lack the annular body 750. For example, in instances in which the poppet valve 700 in integrated into the filtering assembly of an inhalation filter unit 120 or an exhalation filter unit 130, the poppet valve 700 need include the annular body 750. In those embodiments that lack the annular body 750, an elastic member attached to one or more of the holding members 720 can permit opening and closing the poppet valve 700. Such an elastic member can be formed from a conducting material in order to permit electric coupling to the conducting conduits 760.

In addition, or in some embodiments, the antivirus helmet 100 can include a temperature sensor and circuitry that can permit measuring body temperature of a subject wearing the antivirus helmet 100. The temperature sensor and/or the circuitry can be assembled near the power button 190, on an inner surface of the solid covering 110, for example. Body temperature can be measured nearly continuously, periodically, with a defined configurable period, or according to a schedule. For example, in situations in which the antivirus helmet 100 is used during a long-haul trip, such as during a transatlantic air trip, the body temperature can be measured hourly, beginning at the time of check-in and ending when the helmet is removed after arrival.

Further, or in yet other embodiments, temperature data identifying body temperature can be combined with other types of data in order to assess a health condition of a subject wearing the antivirus helmet 100. To that end, in some embodiments, the antivirus helmet 100 can include other types of sensors to measure vital signs of the subject. In one example, the antivirus helmet 100 can include a heart rate (HR) monitoring device that can generate HR data indicative of the heart rate of the subject. The heart rate monitoring device can probe the heart rate in essentially real-time and/or at determined instances (e.g., periodically or according to a schedule). In one configuration, the HR monitoring device can be assembled on or near the sleeve 170, making contact with skin of the subject wearing the antivirus helmet 100. In that configuration, the HR monitoring device can include optical elements (light sources, photodetectors, etc.) and circuitry to measure changes in reflectance of subcutaneous blood flow in order to determine a HR rate using photoplethysmography (PPG). Simply for purposes of illustration, PPG relies on optical measurements to determine volumetric variations of blood circulation in the microvascular bed of tissue. A heart rate can then be determined utilizing those variations.

The antivirus helmet 100 also can include a breathing rate (BR) monitoring device that can generate BR data indicative of the breathing rate of the subject. In one example, the BR monitoring device embodied into a pressure sensor that can be integrated into one of the inhalation filter unit 120 or the exhalation filter unit 130. By detecting changes in pressure, in some configurations, the pressure sensor can generate a time series of pressure value in either the inhalation filter unit 120 or the exhalation filter unit 130. A control component (see below) can be functionally coupled to the pressure sensor and can receive data corresponding to the time series and/or data defining or representing a particular pressure value at a particular time. The control component can receive such data and can Fourier transform the time series to extract a characteristic frequency representative of breathing rate. In some configuration, the control component can generate the time series instead of receiving the time series from the pressure sensor. In addition, or in some embodiments, the control component can process the received data, e.g., can apply a patter recognition algorithm to such data, in order to detect abnormalities in the breathing of the subject, for example. The pressure sensor can be embodied in a differential pressure sensor, for example. The differential pressure sensor can have a small form factor (e.g., characteristic length of about 1.0 cm) that permits integrating the differential pressure sensor into an inner surface of the breathing module 115. The pressure sensor can be a customized component or an off-the-shelf component.

In sonic embodiments, multiple pressure sensors can be integrated into one or more of the breathing module 115, the IFU 120 or the EFU 130. In those embodiments, greater reliability can be accomplished during the monitoring of pressure and the determination of a breathing rate.

In other embodiments, the differential pressure sensor can substitute one or more of the different pressure monitor devices (e.g., device 320, device 420, device 620, or a combination thereof). In those embodiments, the control component can receive data, either essentially continually or at defined times (periodically or otherwise), and can use the data to determine that an air-forcing unit (e.g., air-forcing unit 314 or air-forcing unit 414, or both) is to be energized. Thus, the control component can cause the send a control signal (analog or digital) to the air-forcing unit to cause the air-forcing unit to transition from a power-off state to a power-on state.

The HR data and BR data, individually or in combination, with temperature data can be utilized to assess the health condition of the subject.

A control component can be functionally coupled to one or more of the temperature sensor, the HR monitoring device, or the BR monitoring device. Thus, the control component can receive temperature data identifying values of body temperature, HR data, and/or BR data. The control component can store the received temperature data, HR data, and/or BR data in one or several memory devices integrated into the antivirus helmet 100. Historical temperature data. HR data, and/or BR data can indicate or otherwise suggest incubation of a contagious disease. In some configurations, the control component can direct—periodically or at defined instants—the radio unit integrated in the antivirus helmet 100 to wirelessly send stored temperature data, HR data, and/or BR data to a computing device remotely located relative to the antivirus helmet 100. The computing device can be embodied in, for example, a mobile device (a smartphone, a tablet computer, a laptop computer, or similar). The mobile device can include a software application (such as a mobile application) configured to receive the temperature data, the HR data, and/or the BR data by means of a wireless connection (e.g., a Bluetooth connection) between the mobile device and the antivirus helmet 100. The mobile device can receive the temperature data in response to executing the software application. The mobile device also can execute, or can continue executing, the software application to send the temperature data, the HR data, and/or the BR data to one or many network server devices that can store the temperature data. The network server device(s) also can operate on the temperature data, the HR data, and/or the BR data to generate reports, graphs, alerts, or a combination thereof. Data resulting from operating on the temperature data, the HR data, and/or the BR data can be accessed by an authorized operator, such as a subject who routinely wears the antivirus helmet 100. The control component can execute program code (e.g., control logic) to direct the radio unit to send stored temperature data periodically or at defined instants.

In one example, the control component can retain historical temperature data in the memory device(s) during a defined period. After the defined period has elapsed, the control component can direct the radio unit to send the retained data to the mobile device. Examples of the defined period include one day, two days, or more than two days (such as a week. two weeks, one month, or multiple months). In another example, the control component can retain historical temperature data in the memory device(s) until a scheduled time or a transmission condition is satisfied (e.g., a transatlantic air trip has ended). The control component can then direct the radio unit to send the retained data to the mobile device. The control component can be embodied in, or can include, for example, a microcontroller, a PLC, or another type of processor.

In addition, or in other configurations, the memory device(s) can include a removable memory card and the temperature data can be stored in the memory card. The memory card can be removed after the antivirus helmet 100 is worn, to analyze changes in body temperature of the subject wearing the antivirus helmet 100 during a defined period. Examples of the defined period include one day, two days, or more than two days (such as a week, two weeks, one month, or multiple months). Further, or in yet other configurations, the antivirus helmet 100 can include a USB port or another port that can be used to download such data, via a wireline connection, from at least one of the memory device(s). The data can be downloaded at a desired time, by a subject that routinely wears the helmet or by another operator (a customs officer or a health officer, for example).

Because protection against a pathogen, heavy-metal particulates, or similar, can be achieved while wearing the antivirus helmet 100, a tampering sensor can be integrated into the antivirus helmet 100. The tampering sensor can detect if the antivirus helmet 100 has been removed and replaced during a particular period. The tampering sensor can record data identifying removal or replacement, or both, of the antivirus helmet 100 in one or more memory devices integrated into the antivirus helmet 100. For example, the tampering sensor can be functionally coupled to a control component (e.g., a microcontroller, a PLC, or another type of processor) that can receive a signal from the tampering sensor identifying the removal of the antivirus helmet 100. In response, the control component can generate a record of such an event and can then store the record in a memory device integrated into the antivirus helmet 100. In some embodiments, the tampering sensor can be a capacitive sensor that can detect proximity between the skull of a subject wearing the antivirus helmet 100 and an interior surface of the antivirus helmet 100, where the surface is proximate the skull. A control component integrated into or otherwise coupled to the antivirus helmet 100 can monitor data defining proximity between the skull and the interior surface. In situations in which the proximity exceeds a threshold distance, the control component can determine that the antivirus helmet 100 has been removed.

In addition, or in some embodiments, the control component can monitor current usage of the antivirus helmet 100, where the usage includes breathing activity, for example Simply for the purposes of illustration, the usage can be evaluated by monitoring data identifying the operation of the inhalation filter unit 120 or the exhalation filter unit 130, or both. The control component can compare current usage to historical usage and, based at least on the comparison, can determine if the antivirus helmet 100 remains in user or the antivirus helmet 100 has been removed.

Further, or in yet other embodiments, the tampering sensor can include a pressure sensor that can probe pressure $P_e$ in the egress compartment of the antivirus helmet 100. The control component can monitor and compare that pressure to $P_{ext}$. Based on that comparison, the control component can determine if the antivirus helmet 100 remains in use or the antivirus helmet 100 has been removed. When removed, the magnitude of $P_e$ is equal to $P_{ext}$. In response to removal of the antivirus helmet 100, the control component can generate a record of such an event and can then store the record in a memory device integrated into the antivirus helmet 100.

Antivirus helmets in accordance with this disclosure can be readily cleaned and disinfected. To that end, an antivirus helmet (e.g., antivirus helmet 100) can be placed into a cleaning container. In some embodiments, the sealed cleaning container can be filled with an amount of a dry-cleaning product that serves to clean and disinfect the antivirus helmet. The dry-cleaning product can include, for example, 70% isopropyl alcohol, hypochlorous acid, or similar. In some configurations, rather than filling the sealed cleaning container with the dry-cleaning product, a cleaning system including a reservoir, a pump, and multiple nozzles can be used to spray the antivirus helmet with the dry-cleaning product. The cleaning system can be coupled to, or integrated within, the sealed cleaning container.

In addition, or in other embodiments, the cleaning container can be fitted with ultraviolet (UV) lighting devices that can illuminate the antivirus helmet for a defined period in order to disinfect the antivirus helmet. The UV lighting devices can be assembled within one or more walls of the cleaning container. The UV lighting devices can be positioned to illuminate the interior of the cleaning container. In such embodiments, the cleaning container can include a power connector that can permit connecting the cleaning box to a power grid to supply electric power to the UV lighting device(s). In the alternative, the cleaning container can include a rechargeable battery that supplies power to the UV lighting device(s).

Further, or in yet other embodiments, the cleaning container can be fitted with a subsystem that supplies an amount of ozone to clean the antivirus helmet 100. To that end, the subsystem can include, or can be coupled to, an oxygen reservoir that can supply oxygen for the generation of ozone by the application of an electric field.

While the technologies (e.g., antivirus helmets and techniques to form the antivirus helmets) of this disclosure have been described in connection with various embodiments and specific examples, it is not intended that the scope be limited to the particular embodiments put forth, as the embodiments herein are intended in all respects to be illustrative rather than restrictive In this application, some components can encompass an entity that includes either hardware, software, or a combination of hardware and software. Such an entity can be embodied in, or can include, for example, a signal processing device. In another example, the entity can be embodied in, or can include, an apparatus with a defined functionality provided by optical parts, mechanical parts, and/or electronic circuitry.

As an example, a component can be localized on one processing device or distributed between two or more processing devices. Components can communicate via local and/or remote architectures in accordance, for example, with a signal (either analogic or digital) having one or more data packets (e.g., data from one component interacting with another component in a local processing device, distributed processing devices, and/or across a network with other systems via the signal).

As another example, a component can be embodied in or can include an apparatus with a defined functionality provided by mechanical parts operated by electric or electronic circuitry that is controlled by a software application or firmware application executed by a processing device. Such a processing device can be internal or external to the apparatus and can execute at least part of the software or firmware application. Still in another example, a component can be embodied in or can include an apparatus that provides defined functionality through electronic components without mechanical parts. The electronic components can include signal processing devices to execute software or firmware that permits or otherwise facilitates, at least in part, the functionality of the electronic components. For the sake of illustration, an example of such processing device(s) (also referred to as processor(s)) includes an integrated circuit (IC), an application-specific integrated circuit (ASIC), a digital signal processor (DSP), a field programmable gate array (FPGA), a PLC, a complex programmable logic device (CPLD), a discrete gate or transistor logic, discrete hardware components, or any combination thereof designed or otherwise configured (e.g., manufactured) to perform the functions described herein.

In some embodiments, components can communicate via local and/or remote processes in accordance, for example, with a signal (either analog or digital) having one or more data packets (e.g., data from one component interacting with another component in a local system, distributed system, and/or across a network such as a wide area network with other systems via the signal). In addition, or in other embodiments, components can communicate or otherwise be coupled via thermal, mechanical, electrical, and/or electromechanical coupling mechanisms (such as conduits, connectors, combinations thereof, or the like). An interface can include input/output (I/O) components as well as associated processors, applications, and/or other programming components.

Conditional language, such as, among others, "can," "could," "might," or "may," unless specifically stated otherwise, or otherwise understood within the context as used, is generally intended to convey that certain implementations could include, while other implementations do not include, some elements and/or operations. Thus, such conditional language generally is not intended to imply that features, elements, and/or operations are in any way required for one or more implementations or that one or more implementations necessarily include logic for deciding, with or without user input or prompting, whether those elements and/or operations are included or are to be performed in any particular implementation.

Flowchart and block diagrams in the Figures illustrate the architecture, functionality, and operation of possible implementations of examples of devices, apparatuses, systems, and methods according to various embodiments of the present disclosure. In this regard. each block in a flowchart or a block diagram may represent a module, segment, or portion of instructions, which includes one or more machine-executable or computer-executable instructions for implementing the specified operations. It is noted that in some embodiments of the disclosed technologies, each block of the block diagrams and/or flowchart illustration, and combinations of blocks in the block diagrams and/or flowchart illustration, can be implemented by special purpose hardware-based devices that perform the specified functions or operations or carry out combinations of special purpose hardware and computer instructions.

Unless otherwise expressly stated, it is in no way intended that any method set forth herein be construed as requiring that its operations be performed in a specific order. Accordingly, where a method claim does not actually recite an order to be followed by its steps or it is not otherwise specifically stated in the claims or descriptions that the steps are to be limited, to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

What has been described herein in the present specification and annexed drawings includes examples of antivirus helmets and techniques to produce the antivirus helmets. It is, of course, not possible to describe every conceivable combination of components and/or methods for purposes of describing the various elements of the disclosure, but it can be recognized that many further combinations and permutations of the disclosed elements are possible. Accordingly, it may be apparent that various modifications can be made to the disclosure without departing from the scope or spirit thereof. In addition, or as an alternative, other embodiments of the disclosure may be apparent from consideration of the specification and annexed drawings, and practice of the disclosure as presented herein. It is intended that the examples put forth in the specification and annexed drawings be considered, in all respects, as illustrative and not limiting. Although specific terms are employed herein, they are used in a generic and descriptive sense only and not for purposes of limitation.

What is claimed is:

1. An antivirus helmet comprising:

a deformable solid covering assembled to receive a head of a subject through a head-opening, a plurality of flexible soft portions partially coupled to said solid covering, an elastic covering attached to said solid covering and to a breathing module, said elastic covering forming one or more hermetic interfaces with said solid covering, a pane hermetically attached to said solid covering, a sleeve assembled around said head-opening, and formed to permit egress of air from the antivirus helmet to an exterior environment, wherein said breathing module comprises one or more inhalation filter units and one or more exhalation filter units, and wherein the only couplings between said antivirus helmet and the exterior environment is provided by said one or more inhalation filter units and said sleeve, the couplings forming a single pathway for air to flow through the antivirus helmet, wherein air from the exterior environment is configured to ingress the antivirus helmet through the one or more inhalation filter units, then is configured to travel through respiratory airways to lungs of the subject wearing the antivirus helmet, wherein exhaled air configured to return from the lungs is then filtered through the one or more exhalation filter units creating filtered air, wherein said filtered air inflates a portion of the solid covering and then egresses the antivirus helmet through the sleeve, wherein inflation of said portion of the solid covering forms an egress compartment that is pressurized due to successive inflations resulting from the exhaled air and slow egress of air in the egress compartment through the sleeve, and wherein said portion of the solid covering is one of the plurality of flexible soft portions of the solid covering located near the one or more exhalation filter units.

2. The antivirus helmet of claim 1, wherein said elastic covering is configured to form a first hermetic interface with a section of said solid covering near a cheekbone area of the subject, a second hermetic interface with an elongated portion of said solid covering near a neck area of the subject, and a third hermetic interface with said pane.

3. The antivirus helmet of claim 1, wherein said one or more inhalation filter units is configured to trap virus cells present in inhaled air, and is thus configured for protecting the subject wearing the antivirus helmet.

4. The antivirus helmet of claim 1, wherein said breathing module comprises two inhalation filter units and two exhalation filter units and wherein said two inhalation filter units and said two exhalation filter units are configured to be removed from the antivirus helmet to probe filtering elements contained in them for presence of a particular type of virus.

5. The antivirus helmet of claim 1, wherein said sleeve is formed to fit snugly around a neck of the subject, permitting slow egress of exhaled air from the antivirus helmet, causing the antivirus helmet to remain at slightly higher pressure than atmospheric pressure in the exterior environment, preventing the ingress of air from the exterior environment into the antivirus helmet.

6. The antivirus helmet of claim 4, wherein said sleeve is formed from a breathable elastic fabric.

7. The antivirus helmet of claim 1, wherein said solid covering is made of a deformable material, wherein said solid covering is deformed while the antivirus helmet is worn, and is restored to an original shape after the antivirus helmet is worn.

8. The antivirus helmet of claim 1, further comprising one or more air-forcing units that are configured to assist the subject with breathing, wherein said one or more inhalation filter units further comprise a filtering assembly and a differential pressure monitor device, wherein said filtering assembly comprises a first-stage filter that is configured to clean coarse particulate matter from air that ingresses the one or more inhalation filter units from the exterior environment, and wherein said first-stage filter comprises nanostructured arrangements of curved tubular fibers arranged in parallel that serve as centrifuges trapping coarse particulate matter.

9. The antivirus helmet of claim 7, wherein said one or more air-forcing units is configured to be energized in response to a reduction in pressure in a breathing compartment formed by the breathing module, wherein said differential pressure monitor device comprises a poppet valve to detect a threshold negative change in pressure relative to pressure in the exterior environment.

10. A method for providing an antivirus helmet, the method comprising the acts of:

a. providing a solid covering formed from a memory shape material, the solid covering defining a head-opening to receive a head of a subject wearing the antivirus helmet;

b. attaching a breathing module to the solid covering, resulting in a first compartment configured to receive inhaled air from an exterior of the antivirus helmet;

c. mounting a first filter unit to the breathing module, the first filter unit configured to receive the inhaled air;

d. mounting a second filter unit to the breathing module, the second filter unit configured to receive exhaled air;

e. attaching an elastic covering to at least the solid covering and the breathing module, wherein the elastic covering and a facial surface of the subject form a pocket configured to receive the exhaled air and to deform in response to receiving the exhaled air, and wherein the deformed pocket constitutes a second compartment containing the exhaled air;

f. attaching a sleeve formed of breathable fabric to the solid covering, the sleeve attached near a periphery of the head-opening and configured to fit snugly around a neck of the subject, wherein the sleeve permits passage of the exhaled air to the exterior; and g. wherein the only couplings between said antivirus helmet and the exterior is provided by said first filter unit and said sleeve, the couplings forming a single pathway for air to flow through the antivirus helmet, wherein air from the exterior is configured to ingress the antivirus helmet through the first filter unit, then travels through respiratory airways to lungs of the subject wearing the antivirus helmet, wherein exhaled air returning from the lungs is then filtered through the second filter unit creating filtered air, wherein said filtered air inflates a portion of the solid covering and then egresses the antivirus helmet through the sleeve, wherein inflation of said portion of the solid covering forms an egress compartment that is pressurized due to successive inflations resulting from the exhaled air and slow egress of air in the egress compartment through the sleeve, and wherein said portion of the solid covering is a flexible soft portion of the solid covering located near the second filter unit.

* * * * *